United States Patent
Nishizaki

(10) Patent No.: US 9,858,518 B2
(45) Date of Patent: Jan. 2, 2018

(54) METHOD FOR GENERATING TWO-DIMENSIONAL BARCODE, DEVICE FOR GENERATING TWO-DIMENSIONAL BARCODE, METHOD FOR READING TWO-DIMENSIONAL BARCODE, DEVICE FOR READING TWO-DIMENSIONAL BARCODE, TWO-DIMENSIONAL BARCODE, AND PROGRAM

(71) Applicant: TOPPAN TDK LABEL CO., LTD., Tokyo (JP)

(72) Inventor: Tsutao Nishizaki, Kawasaki (JP)

(73) Assignee: Toppan TDK Label Co., Ltd., Tokyo (JP)

( * ) Notice: Subject to any disclaimer, the term of this patent is extended or adjusted under 35 U.S.C. 154(b) by 0 days.

(21) Appl. No.: 15/032,419

(22) PCT Filed: Oct. 9, 2014

(86) PCT No.: PCT/JP2014/077084
§ 371 (c)(1),
(2) Date: Apr. 27, 2016

(87) PCT Pub. No.: WO2015/064334
PCT Pub. Date: May 7, 2015

(65) Prior Publication Data
US 2016/0267370 A1 Sep. 15, 2016

(30) Foreign Application Priority Data

Oct. 30, 2013 (JP) .................................. 2013-225332
Oct. 30, 2013 (JP) .................................. 2013-225336

(51) Int. Cl.
*G06K 19/06* (2006.01)
*G06K 7/14* (2006.01)

(52) U.S. Cl.
CPC ..... *G06K 19/06075* (2013.01); *G06K 7/1417* (2013.01); *G06K 7/1426* (2013.01);
(Continued)

(58) Field of Classification Search
CPC ....... G06K 19/06037; G06K 19/06075; G06K 7/1417; G06K 7/1434; G06K 7/1473; G06K 7/1426
(Continued)

(56) References Cited

U.S. PATENT DOCUMENTS

2004/0182930 A1* 9/2004 Nojiri .............. G06K 19/06037
235/462.04
2007/0277150 A1 11/2007 Oouchi
(Continued)

FOREIGN PATENT DOCUMENTS

EP 2000950 A1 12/2008
JP 2006-004378 A 1/2006
(Continued)

OTHER PUBLICATIONS

Japanese Industrial Standards (JIS) X 0510:2004 "Two dimensional symbol—QR Code—Basic specification", English Language Abstract Considered.
(Continued)

*Primary Examiner* — Claude J Brown
(74) *Attorney, Agent, or Firm* — Harness, Dickey & Pierce, P.L.C.

(57) ABSTRACT

A method for generating two-dimensional barcode, including: obtaining a data block including a first data codeword and an error correction codeword, the first data codeword having first information, the error correction codeword being capable of detecting and correcting an error of the first data codeword; and obtaining a replaced data block in which a part of the data block is replaced with a second data
(Continued)

codeword, the second data codeword having second information; and generating a two-dimensional barcode based on the replaced data block. A method for reading a two-dimensional barcode including: reading a two-dimensional barcode; extracting a second data codeword from a predetermined position in a replaced data block; obtaining the second information from the extracted second data codeword; obtaining the first data codeword based on the replaced data block; and obtaining the first information from the obtained first data codeword.

5 Claims, 34 Drawing Sheets

(52) U.S. Cl.
CPC ......... *G06K 7/1434* (2013.01); *G06K 7/1473* (2013.01); *G06K 19/06037* (2013.01)

(58) Field of Classification Search
USPC ........................................................ 235/492
See application file for complete search history.

(56) References Cited

U.S. PATENT DOCUMENTS

| | | | |
|---|---|---|---|
| 2008/0023546 A1* | 1/2008 | Myodo | G06K 7/14 235/462.04 |
| 2009/0166439 A1* | 7/2009 | Su | G06K 19/06037 235/494 |
| 2009/0255992 A1 | 10/2009 | Shen | |
| 2010/0327066 A1 | 12/2010 | Khan | |
| 2012/0256000 A1 | 10/2012 | Cok | |
| 2013/0026241 A1 | 1/2013 | Sakahashi et al. | |
| 2014/0061316 A1* | 3/2014 | Narayanaswami | G06K 19/06037 235/492 |
| 2015/0235118 A1* | 8/2015 | Simske | G06K 19/0614 235/494 |

FOREIGN PATENT DOCUMENTS

| | | |
|---|---|---|
| JP | 2009-009547 | 1/2009 |
| JP | 2009-009547 A | 1/2009 |
| JP | 2009-093443 A | 4/2009 |

OTHER PUBLICATIONS

International Standard, ISO/IEC 18004:2000, Information technology—Automatic identification and data capture techniques—Bar code symbology—QR Code.
International Search Report for PCT/JP2014/077084, ISA/JP, dated Jan. 27, 2015.
Extended European Search Report for corresponding application EP 14858849.4, EPO/Munich, dated Jul. 3, 2017.

* cited by examiner

FIG. 11

METHOD FOR GENERATING TWO-DIMENSIONAL BARCODE, DEVICE FOR GENERATING TWO-DIMENSIONAL BARCODE, METHOD FOR READING TWO-DIMENSIONAL BARCODE, DEVICE FOR READING TWO-DIMENSIONAL BARCODE, TWO-DIMENSIONAL BARCODE, AND PROGRAM

CROSS-REFERENCE TO RELATED APPLICATIONS

This application is a 371 U.S. National Stage of International Application No. PCT/JP2014/077084, filed Oct. 9, 2014, which claims the benefit of and priority to Japanese Patent Application Nos. 2013-225332 and 2013-225336, both filed on Oct. 30, 2013. The entire disclosures of the above applications are incorporated herein by reference.

TECHNICAL FIELD

The invention relates to a technique by which secret information is concealed in a two-dimensional barcode, the two-dimensional barcode indicating information using graphics.

BACKGROUND ART

As a technique of a two-dimensional barcode, by which a graphic code is read and information contained in the code is retrieved, there is Japanese Industrial Standards (JIS)X 0510:2004 "Two dimensional symbol—QR Code—", for example. In addition, a technique for concealing secret information (which is not information to be displayed) into such a two-dimensional barcode is developed. A technique of concealing secret information into such a two-dimensional barcode which has a standard appearance helps to develop application for industries which is demanded handling cryptographic key information or personal information.

[Patent Literature 1] discloses a technique that, in an encrypted matrix two-dimensional barcode composed of black and white pattern, a key for decoding is indicated by deformed cells which have a shape or density different from standard ones.

[Patent Literature 2] discloses a technique that the decryption key code pattern of an encrypted two-dimensional barcode overlaps in a configuration in which the key code pattern is overwritten on a region of at least either one of a data codeword region and a correction codeword region on the generated two-dimensional barcode pattern.

[Patent Literature 3] discloses a technique for generating a code graphics as follow. If the total number of data codewords, which are coded as codewords indicating data is smaller than the predetermined total number of codewords for generating a two-dimensional barcode, a terminator is placed next to the foregoing codeword region. In addition, secret data codes are placed instead of a part of padding codes which should be placed next to the terminator.

CITATION LIST

Patent Literature

[Patent Literature 1] Japanese Unexamined Patent Application Publication No. 2006-4378

[Patent Literature 2] Japanese Unexamined Patent Application Publication No. 2009-93443

[Patent Literature 3] Japanese Unexamined Patent Application Publication No. 2009-9547

[Non Patent Literature 1] Japanese Industrial Standards X 0510:2004

SUMMARY OF INVENTION

Technical Problem

With techniques of [Patent Literature 1] and [Patent Literature 2], "deformed cells" or "black and white pattern" indicating decryption key information, which is information to be concealed, are generated on a code pattern graphics, the "deformed cells" or "black and white pattern" being different from those of original codes. And, replacing (in other words, overwriting) operation is performed at a predetermined region or positions on the graphics.

In the foregoing techniques, key information, which is used for decoding a two-dimensional barcode, is not encrypted. Accordingly, in a code generation system in which an identical cryptographic key is applied, an identical "pattern" is exhibited at the same place. There is therefore a possibility that careful observation of a graphic code pattern raises doubts about concealing an information pattern. The same applies to a case of the foregoing "deformed cells".

Even if the foregoing key "pattern" is placed at a plurality of places on a code graphics, replacement positions are predetermined on the graphic pattern because the key pattern is overwritten on the graphic pattern. Accordingly, "fixed parts" can be found by overlapping a plurality of samples of a two-dimensional barcode to which identical key information is applied.

In the foregoing technique, an encoding process requires a special process for generating a pattern graphics which is to be used for overwriting. Such a process is complicated and prevents accelerating operations.

[Patent Literature 3] discloses a technique for generating a code graphics as follow. If the total number of data codewords, which are coded as codewords indicating data is smaller than the predetermined total number of codewords for generating a two-dimensional barcode, a terminator is placed next to the foregoing codeword region. In addition, secret data codes are placed instead of a part of padding codes which should be placed next to the terminator.

With such a technique, different data codes from a code pattern which should be defined as padding codes are placed in a region of padding codes. Accordingly, the foregoing codes are recognized as nonstandard codes by a standard general-purpose decoder, the decoder being in conformance with a code format which is based on a standard defining a code pattern of padding codes as in [Non Patent Literature 1]. In this case, since nonstandard data codes also exist in a data region which is not to be displayed, there is possibility that the behavior of such a standard general-purpose decoder cannot be expected.

If the amount of concealed information is equal to or is larger than the amount of information to be displayed, in some cases, a two-dimensional barcode has an unreasonably larger size than the size of a barcode having the amount of to-be-displayed information which should be obtained in a standard decoding process. This will make a user to distrust the two-dimensional barcode and will raise doubts about concealing information.

For these reasons, a new two-dimensional barcode has been demanded which is capable of concealing information being concealed in addition to information being revealed. Also, there is a demand for appropriately reading the information being concealed of this new two-dimensional barcode.

An aspect of the present invention is to provide a two-dimensional barcode capable of concealing information being concealed in addition to information being revealed. Another aspect of the present invention is to appropriately read the information being concealed from this new two-dimensional barcode.

Solution to Problem

In order to achieve the above advantage, a method for generating a two-dimensional barcode according to the present invention includes: obtaining a data block including a first data codeword and an error correction codeword, the first data codeword having first information, the error correction codeword being capable of detecting and correcting an error of the first data codeword; obtaining a replaced data block in which a part of the data block is replaced with a second data codeword, the second data codeword having second information; and generating a two-dimensional barcode based on the replaced data block.

With a two-dimensional barcode generated as mentioned above, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to provide a two-dimensional barcode capable of concealing the information in addition to information being revealed.

In such a method for generating a two-dimensional barcode according to the present invention, it is desirable that the replaced data block includes a header data codeword, and that the header data codeword contains placement information of the second data codeword in the replaced data block.

With a two-dimensional barcode generated as mentioned above, it is possible to appropriately locate the position of the second data codeword based on the header data codeword.

In such a method for generating a two-dimensional barcode according to the present invention, it is desirable that the total number of the second data codewords and the header data codewords is not greater than the number of words that are able to be corrected with the error correction codeword.

With a two-dimensional barcode generated as mentioned above, the second data codeword and the header data codeword can be appropriately corrected based on the error correction codeword. This makes it possible to reliably obtain the first data codeword.

In such a method for generating a two-dimensional barcode according to the present invention, it is desirable that the second data codewords are discontinuously placed based on placement information of the second data codeword.

With a two-dimensional barcode generated as mentioned above, discontinuously placing the second data codeword can increase conceal ability of the second data codeword. In addition, the placement information makes it possible to appropriately identify the positions of the second data codeword.

In such a method for generating a two-dimensional barcode according to the present invention, it is desirable that at least either one of the header data codeword and the second data codeword contains an error-correction-code word.

With a two-dimensional barcode generated as mentioned above, if the header data codeword contains the error-correction-code word, it is possible to appropriately correct the header data codeword even when the header data codeword has an error. Also, if the second data codeword contains the error-correction-code word, it is possible to appropriately correct the second data codeword even when the second data codeword has an error.

In such a method for generating a two-dimensional barcode according to the present invention, it is acceptable that, in the replaced data block, a part of the second data codeword is replaced with the header data codeword, and that the second data codeword contains an error correction codeword that is capable of detecting and correcting an error of the second data codeword.

With a two-dimensional barcode generated as mentioned above, the position of the second data codeword can be identified based on the header data codeword, and a part of the second data codeword can be corrected by the error correction code, the part of the second data codeword being replaced with the header data codeword. This makes it possible to appropriately obtain the second information from the second data codeword.

In such a method for generating a two-dimensional barcode according to the present invention, a part of the first data codeword may contain the header data codeword, and the header data codeword may contain placement information of the second data codeword in the replaced data block.

With a two-dimensional barcode generated as mentioned above, the first data codeword can be obtained based on the error correction codeword which is included in the replaced data block. Based on the header data codeword which is contained in the first data codeword, it is possible to identify the position of the second data codeword in the replaced data block. This makes it possible to appropriately extract the second data codeword, and also makes it possible to extract the second information from the second data codeword. Accordingly, conceal ability can further increase.

In such a method for generating a two-dimensional barcode according to the present invention, a part of the first data codeword may contain a header-position-data codeword, and the header-position-data codeword may contain placement information of the header data codeword in the replaced data block.

With a two-dimensional barcode generated as mentioned above, the first data codeword can be obtained based on the error correction codeword which is contained in the replaced data block. And, based on the header-position-data codeword which is contained in the first data codeword, it is possible to identify the position of the header data codeword in the replaced data block. Further, the header data codeword can be extracted from the identified position of the header data codeword, and the position of the second data codeword can be identified based on the header data codeword. Finally, the second information can be extracted based on the second data codeword. Accordingly, conceal ability can further increase.

Further, it is acceptable that the two-dimensional barcode is masked with a predetermined mask pattern. And, it is acceptable that obtaining the replaced data block includes: identifying a replacement position in the data block based on a mask pattern reference, the mask pattern reference identifying the predetermined mask pattern; and replacing a part of the data block with the second data codeword at the replacement position.

With such a method, the mask pattern reference, which identifies the mask pattern applied to the two-dimensional barcode, is used to identify the position of the data block the word at which is replaced with the second data codeword. Since there are multiple types of the mask patterns, the mask pattern reference can have a plurality of values. Accordingly, depending on the applied mask pattern, it is possible to change a position which has been replaced with the second data codeword. This makes it difficult for a third party to identify the position of the second data codeword, and therefore it can be further difficult to extract the second information contained in the second data codeword.

It is acceptable that the two-dimensional barcode is masked with a predetermined mask pattern. And, it is acceptable that obtaining the replaced data block includes: locating a replacement position in the data block based on a mask pattern reference, the mask pattern reference identifying the predetermined mask pattern; replacing a part of the data block with the header data codeword at the replacement position; and replacing a part of the data block with the second data codeword at a position that is specified by the header data codeword.

With such a method, the mask pattern reference, which identifies the mask pattern applied to the two-dimensional barcode, is used to locate the position of the data block which is replaced with the header data codeword. Since there are multiple types of the mask patterns, the mask pattern reference can have a plurality of values. Accordingly, depending on the applied mask pattern, it is possible to change the position of the data block which is replaced with the header data codeword. This makes it difficult for a third party to locate the position of the header data codeword. Since the header data codeword locates the position of the second data codeword, it can be further difficult to extract the second data codeword.

It is desirable that the two-dimensional barcode is a QR code, and that the mask pattern reference is contained in format information of the QR code.

The format information of the QR code is not masked by the standard mask pattern (a predetermined mask pattern), according to JIS. Accordingly, when a QR code is read, it is possible to appropriately read the mask pattern reference, which is contained in the format information. Using a predetermined mask pattern identified by the mask pattern reference, masking can be removed. In the replaced data codewords which is obtained after the masking is removed, using the mask pattern reference makes it possible to appropriately locate the position of the second data codeword or the position of the header data codeword.

In such a method for generating a two-dimensional barcode according to the present invention, obtaining the replaced data block may include: identifying a replacement position in the data block based on the error correction codeword; and replacing a part of the data block with the second data codeword at the replacement position.

The error correction codeword is obtained based on the first data codeword. Accordingly, a different first data codeword leads to a different error correction codeword. That is, when the replacement position is identified based on the error correction codeword, a replacement position is different if a first data codeword is different. This makes it difficult for a third party to identify the position of the second data codeword, and therefore it can be further difficult to extract the second information contained in the second data codeword.

In such a method for generating a two-dimensional barcode according to the present invention, obtaining the replaced data block may include: identifying a replacement position in the data block based on the error correction codeword; replacing a part of the data block with the header data codeword at the identified replacement position; and replacing a part of the data block with the second data codeword at a position that is specified by the header data codeword.

The error correction codeword is obtained based on the first data codeword. Accordingly, a different first data codeword leads to a different error correction codeword. That is, when the replacement position is identified based on the error correction codeword, a replacement position is different if a first data codeword is different. This makes it difficult for a third party to identify the position of the header data codeword. Since the header data codeword identifies the position of the second data codeword, it can be further difficult to extract the second data codeword.

In such a method for generating a two-dimensional barcode according to the present invention, it is desirable that the error correction codeword is a Reed-Solomon code.

With such a two-dimensional barcode generated as mentioned above, since a Reed-Solomon code, which has a great correcting capability as the error correction codeword, is used, it is possible to appropriately obtain the first data codeword.

In such a method for generating a two-dimensional barcode according to the present invention, it is desirable that the method further comprises outputting the generated two-dimensional barcode.

With such a method for generating a two-dimensional barcode, the generated two-dimensional barcode can be output by means such as printing and can be read by a suitable decoder.

In order to achieve the above advantage, a two-dimensional barcode according to the present invention is generated based on a replaced data block, the replaced data block in which a part of a data block is replaced with a second data codeword, the data block including a first data codeword and an error correction codeword, the first data codeword having first information, the error correction codeword being capable of detecting and correcting an error of the first data codeword, the second data codeword having second information.

With a two-dimensional barcode generated as mentioned above, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to provide a two-dimensional barcode capable of concealing the information in addition to information being revealed.

In order to achieve the above advantage, a device for generating a two-dimensional barcode according to the present invention generates a two-dimensional barcode based on a replaced data block, the replaced data block in which a part of a data block is replaced with a second data codeword, the data block including a first data codeword and an error correction codeword, the first data codeword having first information, the error correction codeword being capable of detecting and correcting an error of the first data codeword, the second data codeword having second information.

With a two-dimensional barcode generated as mentioned above, though a part of the first data codeword and a part of the error correction codeword are replaced with second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to provide a two-dimensional barcode capable of concealing the information in addition to information being revealed.

In order to achieve the above advantage, a program according to the present invention causes a computer to perform the following processes: obtaining a data block including a first data codeword and an error correction codeword, the first data codeword having first information, the error correction codeword being capable of detecting and correcting an error of the first data codeword; obtaining a replaced data block in which a part of the data block is replaced with a second data codeword, the second data codeword having second information; and generating a two-dimensional barcode based on the replaced data block.

With a two-dimensional barcode generated as mentioned above, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to provide a two-dimensional barcode capable of concealing the information in addition to information being revealed.

In order to achieve the above advantage, it is desirable that a method for reading a two-dimensional barcode according to the present invention includes: reading a two-dimensional barcode, the two-dimensional barcode being generated based on a replaced data block, the replaced data block being obtained by replacing a part of a data block with a second data codeword, the data block including a first data codeword and an error correction codeword, the first data codeword having first information, the second data codeword having second information, the error correction codeword being capable of detecting and correcting an error of the first data codeword; extracting the second data codeword from a predetermined position in the replaced data block; obtaining the second information from the extracted second data codeword; obtaining the first data codeword based on the replaced data block; and obtaining the first information from the obtained first data codeword.

With such a method for reading a two-dimensional barcode, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to appropriately read the information being concealed.

In such a method for reading a two-dimensional barcode according to the present invention, it is desirable that the replaced data block includes a header data codeword, and that the predetermined position is identified based on the header data codeword.

With such a method for reading a two-dimensional barcode, it is possible to appropriately locate the position of the second data codeword based on the header data codeword.

In such a method for reading a two-dimensional barcode according to the present invention, it is desirable that the total number of the second data codewords and the header data codewords is not greater than the number of words that are able to be corrected with the error correction codeword.

With such a method for reading a two-dimensional barcode, the second data codeword and the header data codeword can be appropriately corrected based on the error correction codeword. This makes it possible to reliably obtain the first data codeword.

In such a method for reading a two-dimensional barcode according to the present invention, it is desirable that the header data codeword contains placement information of the second data codewords, and that the second data codewords are discontinuously placed based on the placement information.

With such a method for reading a two-dimensional barcode, discontinuously placing the second data codewords can increase conceal ability of the second data codewords. In addition, the placement information makes it possible to appropriately identify the positions of the second data codeword.

In such a method for reading a two-dimensional barcode according to the present invention, it is desirable that at least either one of the header data codeword and the second data codeword contains an error-correction-code word.

With such a method for reading a two-dimensional barcode, if the header data codeword contains the error-correction-code word, it is possible to appropriately correct the header data codeword even when the header data codeword has an error. Also, if the second data codeword contains the error-correction-code word, it is possible to appropriately correct the second data codeword even when the second data codeword has an error.

In such a method for reading a two-dimensional barcode according to the present invention, in the replaced data block, a part of the second data codeword is replaced with the header data codeword, the second data codeword contains an error correction codeword that is capable of detecting and correcting the second data codeword, and obtaining the second information includes: identifying the predetermined position based on the header data codeword, obtaining the second data codeword from the identified predetermined position, a part of the second data codeword being replaced with the header data codeword; correcting the second data codeword based on the error correction codeword contained in the second data codeword; and obtaining the second information from the corrected second data codeword.

With such a method for reading a two-dimensional barcode, the position of the second data codeword can be identified based on the header data codeword, and a part of the second data codeword can be corrected by the error correction code, the part of the second data codeword being replaced with the header data codeword. This makes it possible to appropriately obtain the second information from the second data codeword.

In such a method for reading a two-dimensional barcode according to the present invention, a part of the first data codeword contains the header data codeword, and obtaining the second information includes: obtaining the header data codeword by correcting an error of the replaced data block; obtaining the second data codeword by identifying a position of the second data codeword based on the obtained header data codeword, the position of the second data codeword being in the replaced data block; and obtaining the second information from the obtained second data codeword.

With such a method for reading a two-dimensional barcode, the first data codeword can be obtained based on the error correction codeword contained in the replaced data block. And, based on the header data codeword contained in the first data codeword, it is possible to identify the position of the second data codeword in the replaced data block. This makes it possible to appropriately extract the second data codeword, and also makes it possible to extract the second information from the second data codeword. Accordingly, conceal ability can further increase.

In such a method for reading a two-dimensional barcode according to the present invention, a part of the first data codeword may contain a header-position-data codeword, the header-position-data codeword identifying a position of the header data codeword. Also, obtaining the second information may include: obtaining the header-position-data codeword by correcting an error of the replaced data block, the header-position-data codeword being contained the first data codeword; obtaining the header data codeword by identifying the position of the header data codeword based on the extracted header-position-data codeword; obtaining the second data codeword by identifying a position of the second data codeword based on the obtained header data codeword, the position of the second data codeword being in the replaced data block; and obtaining the second information from the obtained second data codeword.

With such a method for reading a two-dimensional barcode, the first data codeword can be obtained based on the error correction codeword which is contained in the replaced data block. And, based on the header-position-data codeword which is contained in the first data codeword, it is possible to identify the position of the header data codeword in the replaced data block. Further, the header data codeword can be extracted from the identified position of the header data codeword, and the position of the second data codeword can be identified based on the header data codeword. Finally, the second information can be extracted based on the second data codeword. Accordingly, conceal ability can further increase.

In such a method for reading a two-dimensional barcode according to the present invention, the two-dimensional barcode may be masked with a predetermined mask pattern. Further, reading the two-dimensional barcode may include reading a mask pattern reference, the mask pattern reference identifying the predetermined mask pattern that is applied to the two-dimensional barcode. Also, extracting the second data codeword from the predetermined position in the replaced data block may include: identifying a replacement position in the replaced data block based on the mask pattern reference; and extracting the second data codeword from the identified replacement position in the replaced data block.

With such a method, the mask pattern reference, which identifies the mask pattern applied to the two-dimensional barcode, is used to identify the position the word at which is replaced with the second data codeword. Since there are multiple types of the mask patterns, the mask pattern reference can have a plurality of values. Accordingly, depending on the applied mask pattern, it is possible to change a position which has been replaced with the second data codeword. This makes it difficult for a third party to identify the position of the second data codeword, and therefore it can be further difficult to extract the second information contained in the second data codeword.

In such a method for reading a two-dimensional barcode according to the present invention, the two-dimensional barcode may be masked with a predetermined mask pattern. Further, reading the two-dimensional barcode may include reading a mask pattern reference, the mask pattern reference identifying the predetermined mask pattern that is applied to the two-dimensional barcode. And, extracting the second data codeword from a predetermined position in the replaced data block may include: identifying a replacement position in the replaced data block based on the mask pattern reference; extracting the header data codeword from the identified replacement position in the replaced data block; and extracting the second data codeword from a position that is identified by the extracted header data codeword of the replaced data block.

With such a method, the mask pattern reference, which identifies the mask pattern applied to the two-dimensional barcode, is used to locate the position of the data block which is replaced with the header data codeword. Since there are multiple types of the mask patterns, the mask pattern reference can have a plurality of values. Accordingly, depending on the applied mask pattern, it is possible to change the position of the data block which is replaced with the header data codeword. This makes it difficult for a third party to locate the position of the header data codeword. Since the header data codeword locates the position of the second data codeword, it can be further difficult to extract the second data codeword.

In such a method for reading a two-dimensional barcode according to the present invention, it is desirable that the two-dimensional barcode is a QR code, and that the mask pattern reference is contained in format information of the QR code.

The format information of the QR code is not masked by the standard mask pattern (a predetermined mask pattern), according to JIS. Accordingly, when a QR code is read, it is possible to appropriately read the mask pattern reference, which is contained in the format information. Using a predetermined mask pattern identified by the mask pattern reference, masking can be removed. In the replaced data codewords which is obtained after the masking is removed, using the mask pattern reference makes it possible to appropriately locate the position of the second data codeword or the position of the header data codeword.

In such a method for reading a two-dimensional barcode according to the present invention, extracting the second data codeword from the predetermined position in the replaced data block may include: identifying a replacement position in the replaced data block based on the error correction codeword, and extracting the second data codeword from the replacement position in the replaced data block.

The error correction codeword is obtained based on the first data codeword. Accordingly, a different first data codeword leads to a different error correction codeword. That is, when the replacement position is identified based on the error correction codeword, a replacement position is different if a first data codeword is different. This makes it difficult for a third party to identify the position of the second data codeword, and therefore it can be further difficult to extract the second information contained in the second data codeword.

In such a method for reading a two-dimensional barcode according to the present invention, extracting the second data codeword from a predetermined position in the replaced data block may include: identifying a replacement position in the replaced data block based on the error correction codeword; extracting the header data codeword from the identified replacement position in the replaced data block; and extracting the second data codeword from a position that is specified by the header data codeword in the replaced data block.

The error correction codeword is obtained based on the first data codeword. Accordingly, a different first data codeword leads to a different error correction codeword. That is, when the replacement position is identified based on the error correction codeword, a replacement position is different if a first data codeword is different. This makes it difficult for a third party to identify the position of the header data codeword. Since the header data codeword identifies the position of the second data codeword, it can be further difficult to extract the second data codeword.

In such a method for reading a two-dimensional barcode according to the present invention, it is desirable that obtaining the first data codeword based on the replaced data block includes correcting an error of the replaced data block using an error correction codeword, the error correction codeword being included in the replaced data block.

With such a method for reading a two-dimensional barcode, since the error correction codeword is used, it is possible to appropriately obtain the first data codeword.

In such a method for reading a two-dimensional barcode according to the present invention, it is desirable that the error correction codeword is a Reed-Solomon code.

With such a method for reading a two-dimensional barcode, since a Reed-Solomon code, which has a great correcting capability as the error correction codeword, is used, it is possible to appropriately obtain the first data codeword.

In such a method for reading a two-dimensional barcode according to the present invention, it is desirable that the method further comprises outputting at least either one of the first information and the second information.

With such a method for reading a two-dimensional barcode, it is possible to obtain the decoded first information or the decoded second information.

In order to achieve the above advantage, it is desirable that method for reading a two-dimensional barcode according to the present invention includes: reading a two-dimensional barcode, the two-dimensional barcode being generated based on a replaced data block, the replaced data block being obtained by replacing a part of a data block with a second data codeword, the data block including a first data codeword and an error correction codeword, the first data codeword having first information, the second data codeword having second information, the error correction codeword being capable of detecting and correcting an error of the first data codeword; obtaining the data block based on the replaced data block; obtaining the second data codeword based on the data block and the replaced data block; and obtaining the second information from the obtained second data codeword.

With such a method for reading a two-dimensional barcode, though a part of the first codeword and a part of the error correction codeword are replaced with the second data codeword, the first data codeword can be corrected and recovered using the correction codeword. On the other hand, the second data codeword can be obtained by making a comparison and by obtaining the difference between data before correction of the replaced data block and data after the correction. Based on the obtained second data codeword, the second information can be acquired. If, in this case, the second information contains information being concealed, it is possible to appropriately read the information being concealed.

In such a method for reading a two-dimensional barcode according to the present invention, it is desirable that obtaining the second data codeword based on the data block and the replaced data block includes extracting a part from the replaced data block, the part not being identical between the data block and the replaced data block.

With such a method for reading a two-dimensional barcode, a comparison is made between the data block and the replaced data block and the different part can consequently be specified as the second data codeword.

In such a method for reading a two-dimensional barcode according to the present invention, it is desirable that obtaining the data block based on the replaced data block includes correcting an error of the replaced data block using the error correction codeword, the error correction codeword being included in the replaced data block.

With such a method for reading a two-dimensional barcode, an error of the replaced data block can be corrected using the error correction codeword, and the unreplaced data block can be consequently recovered.

In such a method for reading a two-dimensional barcode according to the present invention, it is desirable that the method further includes obtaining the first information from the first data codeword based on the obtained data block and the replaced data block.

With such a method for reading a two-dimensional barcode, if the first information is information being revealed, it is possible to appropriately acquire the information being revealed and information being concealed.

In order to achieve the above advantage, it is desirable that a device for reading a two-dimensional barcode according to the present invention includes: a reading section that reads a two-dimensional barcode, the two-dimensional barcode being generated based on a replaced data block, the replaced data block being obtained by replacing a part of a data block with a second data codeword, the data block including a first data codeword and an error correction codeword, the first data codeword having first information, the second data codeword having second information, the error correction codeword being capable of detecting and correcting an error of the first data codeword; and a control section that extracts the second data codeword from a predetermined position in the replaced data block, that obtains the second information from the extracted second data codeword, that obtains the first data codeword based on the replaced data block, and that obtains the first information from the obtained first data codeword.

With such a device for reading a two-dimensional barcode, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. In this case, the second information can contain information being concealed. This makes it possible to appropriately read the information being concealed.

In order to achieve the above advantage, it is desirable that a program according to the present invention causes a computer to perform the following processes: reading a two-dimensional barcode, the two-dimensional barcode being generated based on a replaced data block, the replaced data block being obtained by replacing a part of a data block with a second data codeword, the data block including a first data codeword and an error correction codeword, the first data codeword having first information, the second data codeword having second information, the error correction codeword being capable of detecting and correcting an error of the first data codeword; extracting the second data codeword from a predetermined position in the replaced data block; obtaining the second information from the extracted second data codeword; obtaining the first data codeword based on the replaced data block; and obtaining the first information from the obtained first data codeword.

With such a program, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. In this case, the second information can contains information being concealed. This makes it possible to appropriately read the information being concealed.

Advantageous Effects of Invention

With a two-dimensional barcode configured in the foregoing manner, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. If, in this case, the second information contains information being concealed, it is possible to provide a two-dimensional barcode capable of concealing the information being concealed in addition to information being revealed.

With the foregoing method for reading a two-dimensional barcode, though a part of the first data codeword and a part of the error correction codeword are replaced with the second data codeword, the first data codeword can be corrected and recovered using the correction codeword. The second data codeword can be extracted from a replaced data block, the replaced data block having not undergone error correction and being obtained by directly reading the two-dimensional barcode. Based on the extracted second data codeword, the second information can be acquired. In this case, the second information can contains information being concealed. This makes it possible to appropriately read the information being concealed.

BRIEF DESCRIPTION OF DRAWINGS

FIG. 11 is a diagram illustrating a method for extracting original data.

DESCRIPTION OF EMBODIMENTS

===First Embodiment===

A two-dimensional barcode according to the first embodiment will be described below. As an example of a two-dimensional barcode, a QR code will described below. However, a two-dimensional barcode may be a Datamatrix, a MaxiCode, a VeriCode, a Karura code, a CP code, or the like.

Unless otherwise stated, the following description is in conformance with Japanese Industrial Standards X 0510: 2004 "Two dimensional symbol—QR Code—" (hereinafter merely referred to as "JIS"). An encoder in conformance with JIS is referred to as a standard encoder, and a decoder in conformance with JIS is referred to as a standard decoder. An encoder which can handles conceal information according to the first embodiment is referred to as an enhanced encoder, and such a decoder is referred to as an enhanced decoder. These apparatuses will be distinguished below.

In the following description, a "codeword" is eight bits long. But, the bit length of a "codeword" may be different such as 16 bits, one bit, or the like, depending on a system.

Figure 1:
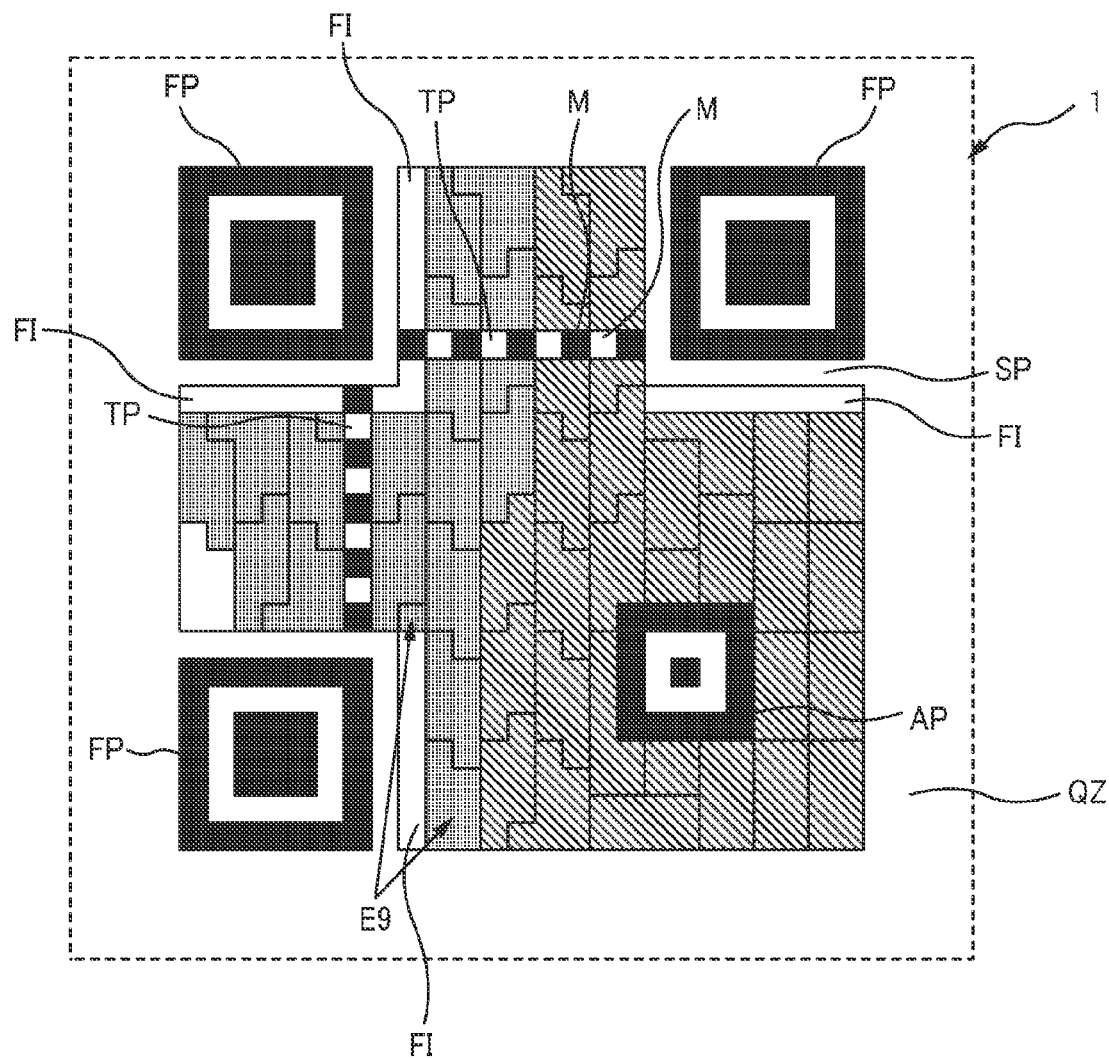
FIG. 1 is a diagram illustrating a QR code symbol 1.

FIG. 1 is a diagram illustrating a QR code symbol 1. The QR code symbol 1 has various sizes which range from version 1 to version 40, but functions of version "2" QR code will be described in this example.

The QR code symbol 1 has a function pattern and an encoding region. The function pattern is a pattern required to locate the position of the QR code symbol and to identify the characteristics of the same; the locating and the identifying are necessary to assist in decoding the modules of the QR code. The encoding region is a region in which necessary information is written.

The function pattern includes finder patterns FP, separators SP, timing patterns TP, alignment patterns AP and a quiet zone QZ.

The finder patterns FP are respectively placed at least at three corners of a QR code symbol. At the time of reading, identifying three finder patterns FP allows the orientation and position of the QR code symbol 1 to be exactly specified.

The separators SP are each light modules of one module width, and are each located around each finder pattern FP. This makes it possible to separate the finder patterns FP from the rest of the QR code symbol 1.

The module M is a unit cell constituting the QR code symbol 1. In principle, one bit is equivalent to one module.

The timing patterns TP are each a pattern in which dark and light modules are placed in line alternately one by one. With the timing patterns TP, it is possible to identify the number of the modules of the QR code symbol 1. Accordingly, the version of the QR code can be identified.

The alignment patterns AP are patterns placed in the defined locations according to the version of the QR code. In a case of large modules, the alignment patterns AP assist in locating the position of the QR code symbol 1.

The quiet zone QZ is a light module zone of at least 4 modules width, and is located around the QR code.

The enclosing region includes data, error correction codewords, format information FI, and version information. In this example, the data is actual data, and the error correction codewords are those for correcting an error which is caused by misreading of the data. The format information FI contains information on the error correction level applied to the QR code symbol 1 and information on the mask pattern used to the QR code symbol 1. The format information FI is a encode pattern which is required to decode the encoding region. The version information has information of the version of the QR code.

Figure 2:
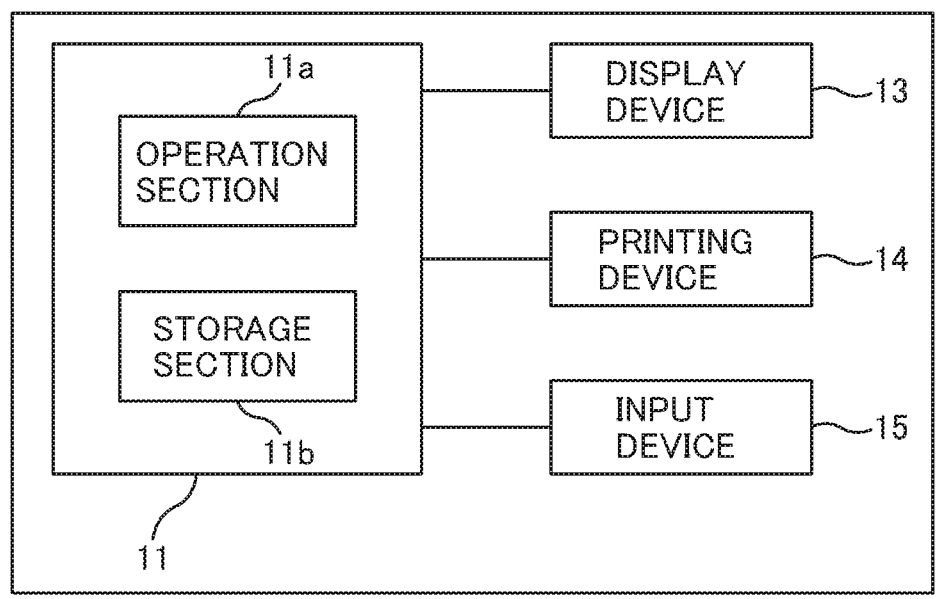
FIG. 2 is a block diagram of an enhanced encoder 10 according to the first embodiment.

FIG. 2 is a block diagram of an enhanced encoder 10 according to the first embodiment. The enhanced encoder 10 is an apparatus that converts, to the QR code symbol 1, information to be displayed and conceal information. The enhanced encoder 10 includes a control section 11, a display device 13, a printing device 14 and an input device 15.

The control section 11 includes an operation section 11a and a storage section 11b. The operation section 11a is composed of units such as a Central Processing Unit, and serves as executing programs and performing various operations. The storage section 11b stores data necessary to execute programs. In particular, the storage section 11b stores a program for executing a method for generating a QR code (to be described later).

The display device 13 has a display function necessary at the time of inputting data or the like. The display device 13 outputs by displaying a generated QR code symbol 1. And, the printing device 14 also outputs by printing a generated QR code symbol 1. The input device 15 is used for inputting data and is also used for operating the enhanced encoder 10.

The configuration of the enhanced encoder 10 can be realized by installing a program to a common device like a computer, a mobile phone or a smartphone, the program being for executing a method for generating a QR code (to be described later).

Figure 3:
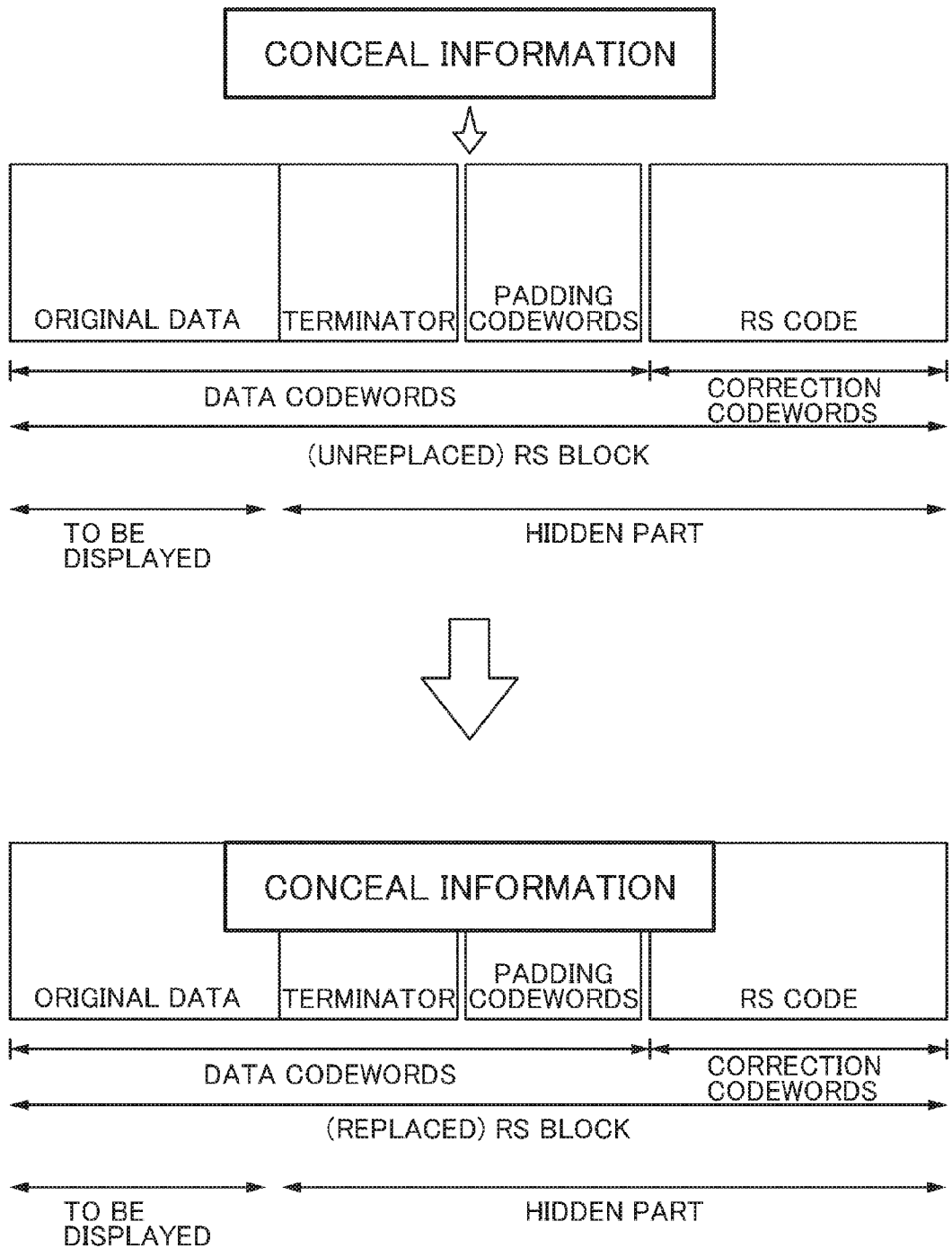
FIG. 3 is a schematic diagram of a RS block according to the first embodiment.

FIG. 3 is a schematic diagram of RS block according to the first embodiment. First, the data format of a QR code according to the first embodiment will be briefly described with reference to FIG. 3. FIG. 3 shows a Reed-Solomon (RS) block, which serves as a unit for error correction. Each QR code symbol 1 contains one or multiple of RS blocks. A single RS block is a unit for error correction.

In the embodiment described herein, since error correction using Reed-Solomon (RS) code is employed, the "RS block" is described as an example of a unit block for operation of detecting and correcting an error.

A RS block contains data codewords (corresponding to the first data codeword) composed of original data to be displayed, a terminator, and padding codewords. The RS block also contains a Reed-Solomon (RS) code, which serves as correction codewords (corresponding to the correction codeword). The original data is a piece of information which can be decoded by the standard decoder when the QR code symbol 1 is read. The terminator is a code indicating the end of the original data. The padding codewords are provisional codewords used to fill empty positions of codewords when the total number of the codewords of original data does not reach the capacity of the QR code symbol 1. The RS code is a code added for the purpose of error correction to a RS block, which is a unit of error correction.

Error correction level of the QR code can be selected from the following four levels: "level L", "level M", "level Q" and "level H". In "level L", this type of error correction allows to correct up to 7% of whole codewords. For example, the error correction capability allows to recover 7% of the whole codewords of a RS block. In "level M", this type of error correction allows to correct up to 15% of the whole codewords. In "level Q", this type of error correction allows to correct up to 25% of the whole codewords. In "level H", this type of error correction allows to correct up to 30% of the whole codewords. In the first embodiment, conceal information is concealed within a QR code, for example, using "level H", which has the highest error correction capability. It should be noted that error correction level may be changed depending on the number of conceal-information words to be concealed.

The concept of a procedure for concealing information within a QR code according to the first embodiment is as follow. FIG. 3 shows conceal-information words (corresponding to the second data codeword). In the first embodiment, a part of a RS block is replaced with conceal-information words (hereinafter this "replace" is also referred to as "overwrite"). Even if a part of a RS block is replaced, the standard decoder can correct, using a RS code, an original-data section which has been replaced. And, it is possible to extract and display the corrected original-data section. On the other hand, since the conceal-information words are information which is corrected with the RS code and is discarded, the conceal-information words will not be displayed by the standard decoder.

On the other hand, an enhanced decoder 20 according to the first embodiment extracts the conceal-information words from the replaced RS block, as described later. Thereafter, correction is made using the RS code and the original-data section is extracted. According to the foregoing procedure, information is concealed in the QR code symbol 1.

Next, a concrete method for generating a QR code according to the first embodiment will be described.

Figure 4:
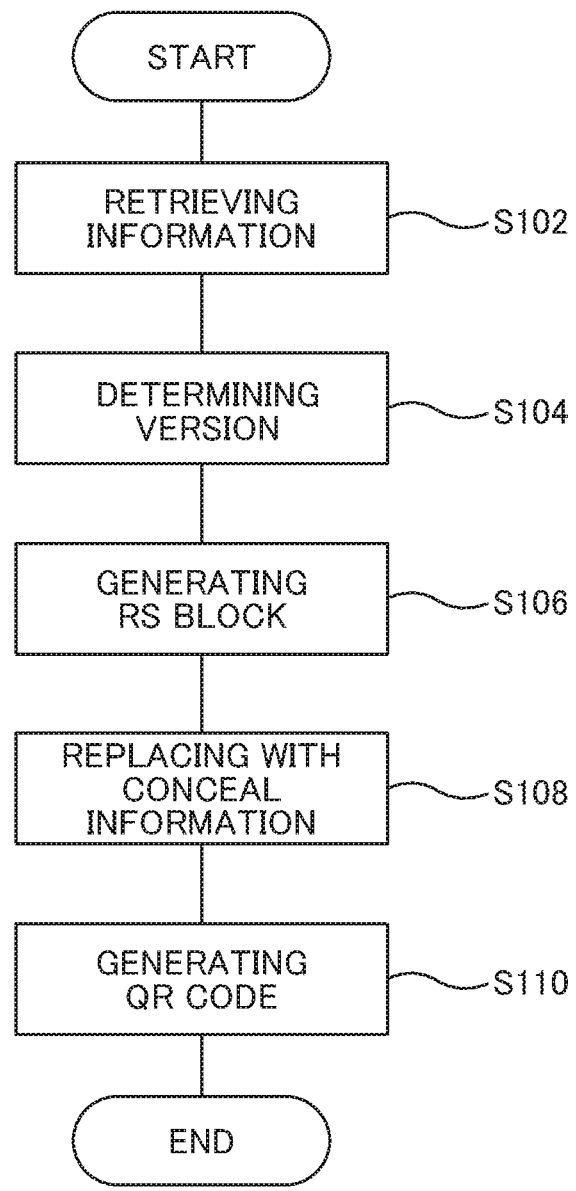
FIG. 4 is a flow chart of a method for generating a QR code symbol according to the first embodiment.
Figure 5:
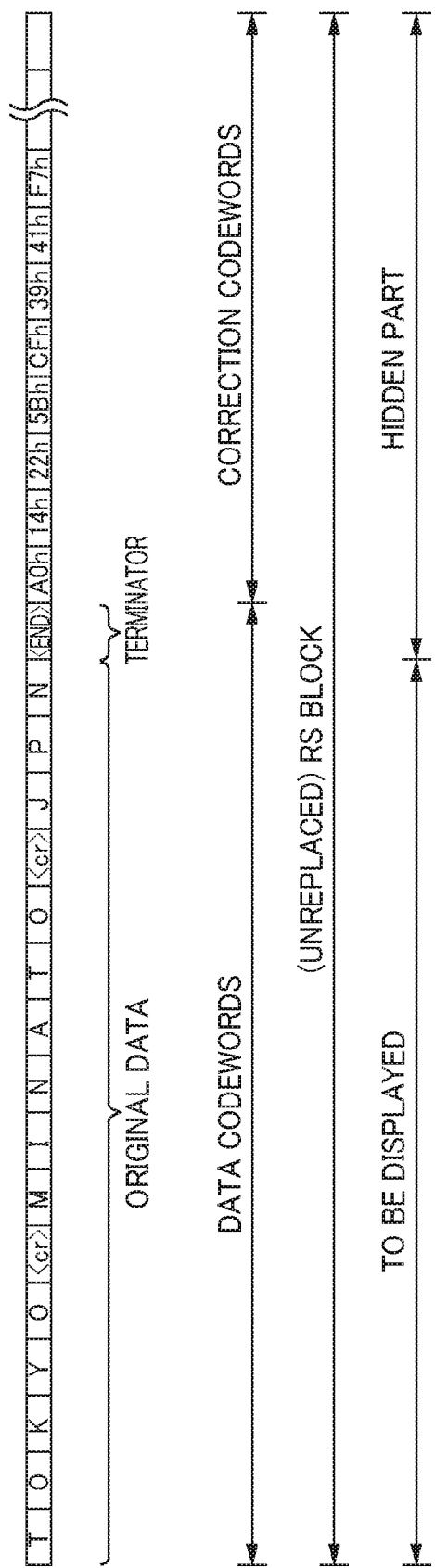
FIG. 5 is a diagram illustrating a RS block.
Figure 6:
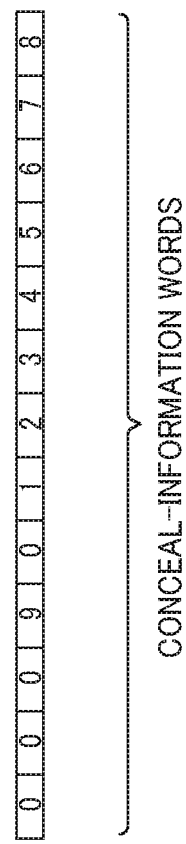
FIG. 6 is a diagram illustrating concealed-information words.

FIG. 4 is a flow chart of a method for generating a QR code symbol according to the first embodiment. FIG. 5 is a diagram illustrating a RS block. FIG. 6 is a diagram illustrating conceal-information words. In the following description, unless otherwise stated, a procedure for encoding data to the QR code symbol 1 is a procedure in conformance with JIS is employed. Though a common QR code symbol 1 is composed of a plurality of RS blocks, one RS block will be described in this example for the purpose of explanation. Since the following description is given as examples in order to simplify the explanation, the lengths of the sets of codewords will be, in some cases, different from those of actual QR code symbols.

The first embodiment assumes that the storage section 11$b$ stores: "offset information" indicating the beginning position at which replacement with conceal-information words starts (to be described later); and, "length (the number of words) information" of the conceal-information words.

First, original data and conceal-information words which are embedded in the QR code symbol 1 are retrieved (S102). In this example, codewords of the original data is "TOKYO<cr>MINATO<cr>JPN" (FIG. 5), and conceal-information words are "00090012345678" (FIG. 6). Retrieving the original data and the conceal-information words may be performed via the input device 14, and also, information stored in advance in the storage section 11$b$ may be used.

Next, the version of the QR code symbol 1 is determined according to the original data and the conceal-information words (S104). According to its version, the total number of the codewords in the QR code symbol 1 is determined. The total number of the codewords is the sum of the number of the correction codewords and the number of the data codewords; the number of the data codewords includes the number of the codewords of the original data. Also, according to the version of the QR code symbol 1, the size and the number of the RS blocks, consisting of the data codewords and the correction codewords, are determined. Error correction is made for each of the RS blocks.

For example, If error correction is "level H" and version is "4", the total number of the codewords is determined "100". It is also determined that a QR code symbol 1 includes four RS blocks. The number of the data codewords per RS block is "9", and the number of the correction codewords per RS block is "16".

The sum of the number of data codewords "9" and the number of correction codewords "16" is "25". Since there are four RS blocks like this, a QR code symbol of version "4" has 100 codewords in total: 25×4=100.

In this case, the number of error-correctable words per RS block is "8". This means a capability of correcting "8" data codewords of total "9" data codewords. Since there are four RS blocks, the QR code symbol has a correcting capability for 32 words in total: 4×8=32. It is possible to correct 32 words of 100 words, and this means that the QR code symbol has correcting capability of 32% in total.

The replacement with conceal-information words is performed so that the number of the replace words in each RS block does not exceed the number of error-correctable words in the RS block. In the foregoing case, "8" codewords for each RS block can be replaced, and "32" codewords in total are allowed to be replaced (also referred to as "the total number of replaceable words").

Based on the foregoing calculation, a version of the QR code symbol 1 having a minimum size is selected in which the number of the conceal-information words does not exceed the total number of replaceable words, and in which the number of the codewords of the original data does not exceed the number of the data codewords.

Next, RS blocks are generated according to the codewords of the original data (S106). In order to generate RS blocks, the codewords of the original data is divided into a plurality of blocks. Error correction codewords are generated for each of the blocks, and the generated correction codewords are added next to the corresponding codewords. Then, RS blocks are generated. A procedure for generating correction codewords can be in conformance with JIS.

FIG. 5 shows an example of an original data, a terminator, and correction codewords. In this example, plain-text information is illustrated as the codewords of the original data. As the terminator, a sequence of bits "0000" may be employed, for example. A RS code which has been generated according to codewords including the original data is added to generate a RS block.

A part of the RS block generated as mentioned above is replaced with conceal-information words (S108).

Figure 7:
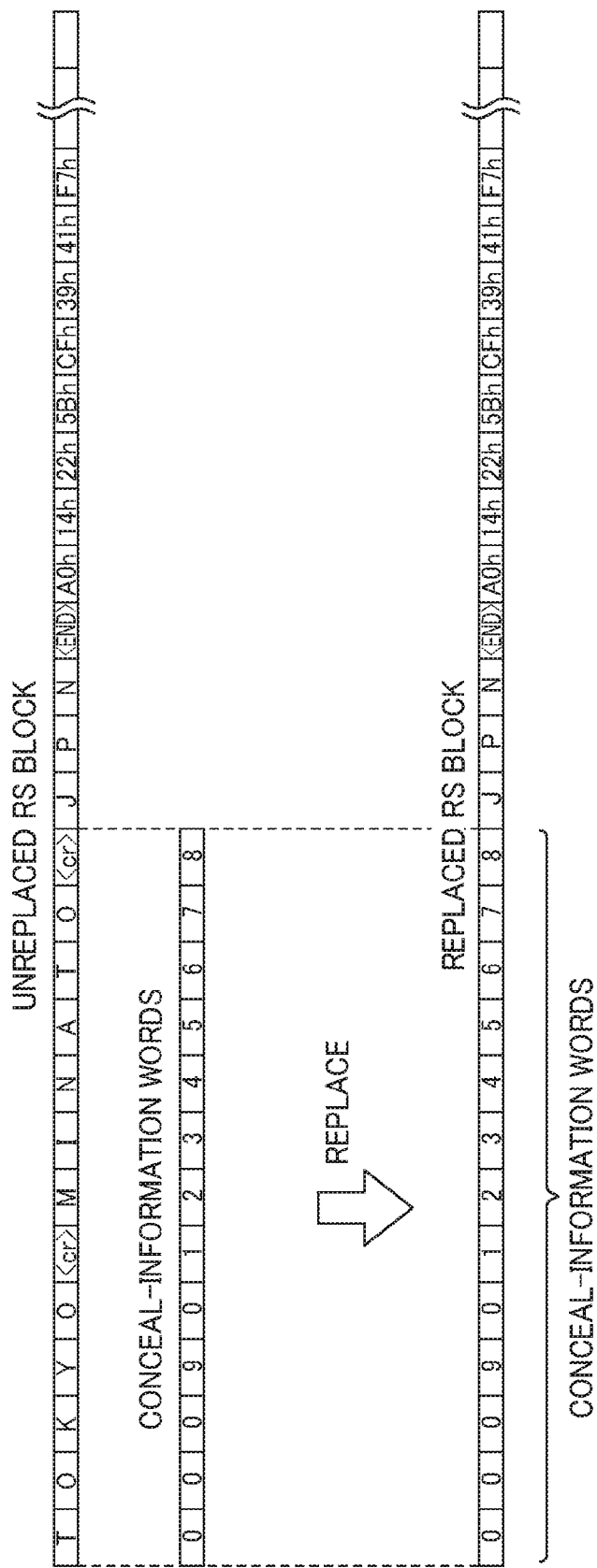
FIG. 7 is a first diagram illustrating how to replace a part of a RS block in a procedure according to the first embodiment.

FIG. 7 is a first diagram illustrating how to replace a part of a RS block in a procedure according to the first embodiment. FIG. 7 shows the foregoing RS block and conceal-information words. In the first embodiment, as shown in FIG. 7, the RS block is replaced from its initial word with the conceal-information words based on the length information and the offset information of the foregoing conceal-information words.

If a part of a RS block is replaced with conceal-information words as mentioned above, a part of the original data is lost. However, since correction can be made for each of the RS blocks, the standard decoder corrects, using a RS code, the original-data section which has been replaced. And, the original-data section can be appropriately extracted and displayed.

The part replaced with the conceal-information words is treated as information which is considered as an error and which is discarded, the error being an error caused by contamination of the QR code symbol 1 or the like. Consequently, the standard decoder cannot display the conceal-information words. On the other hand, the enhanced decoder 20 extracts the conceal-information words from the replaced RS block, as described later. Thereafter, correction is made using the RS code, and the original-data section is extracted. Then, the extracted conceal-information words and the extracted original-data section are displayed.

Next, the QR code symbol 1 is generated based on the replaced RS block (S110). As a procedure for generating the QR code symbol 1 based on the RS block, a procedure similar to a standard procedure for generating a QR code in conformance with JIS may be employed. This makes it possible to generate the QR code symbol 1.

Though, for the purpose of explanation, original data is plain-text data in the foregoing example, the data codewords of the original data themselves may be interleaved or encrypted. Unreplaced RS block may be generated by adding correction codewords to the original data which has been interleaved or the original data which has been encrypted. Interleaving and encrypting mentioned above may be performed for each bit of the original data, not for each codeword of the original data.

Also, the conceal-information words may be interleaved or encrypted. The conceal-information words may be encoded for the purpose of error detection or error correction (for example, coded into a RS code).

Next, a procedure for decoding the QR code symbol 1 generated as mentioned above will be described.

Figure 8:
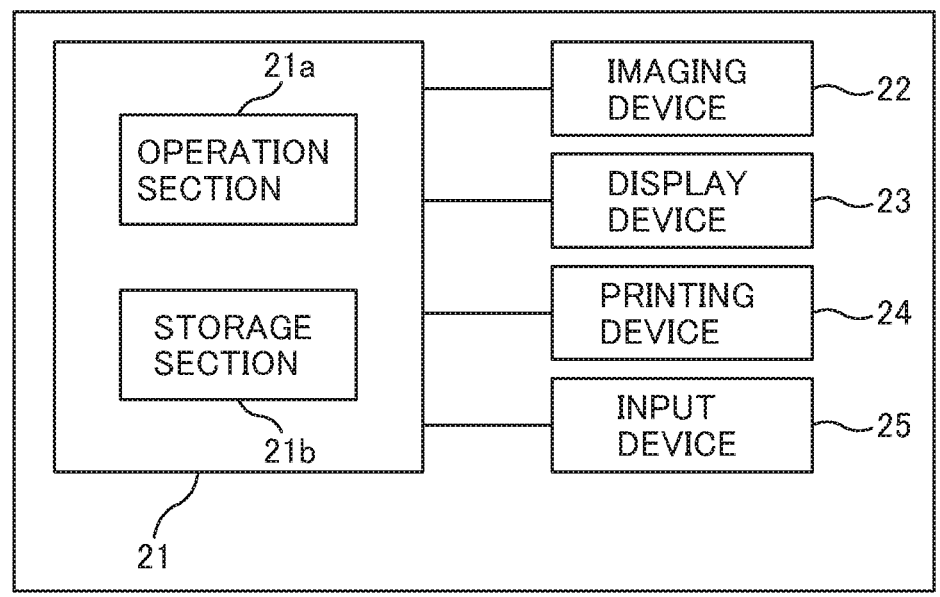
FIG. 8 is a block diagram of an enhanced decoder 20.

FIG. 8 is a block diagram of the enhanced decoder 20. The enhanced decoder 20 is an apparatus reading the QR code symbol and expanding: conceal-information words and information which is to be displayed and contained in the QR code symbol 1. The enhanced decoder 20 includes a control section 21, an imaging device 22, a display device 23, a printing device 24 and an input device 25.

The control section 21 includes an operation section 21a and a storage section 21b. The operation section 21a is composed of units such as a Central Processing Unit, and serves as executing programs and performing various operations. The storage section 21b stores data necessary to execute programs. In particular, the storage section 21b stores a program for executing a method for reading a QR code (to be described later).

The imaging device 22 is a device for imaging the QR code symbol 1 such as CCD camera or the like.

The display device 23 has a display function necessary at the time of inputting data or the like. The display device 23 outputs by displaying information expanded from a QR code.

The printing device 24 outputs by printing such expanded information. The input device 25 is used for inputting data and is also used for operating the enhanced decoder 20.

The configuration of the enhanced decoder 20 can be realized by installing a program to a common device having the imaging device 22 like a computer, a mobile phone or a smartphone, the program being for executing a method for reading a QR code (to be described later). The configuration can also be realized by combining the enhanced encoder 10 and the enhanced decoder 20 mentioned above.

Figure 9:
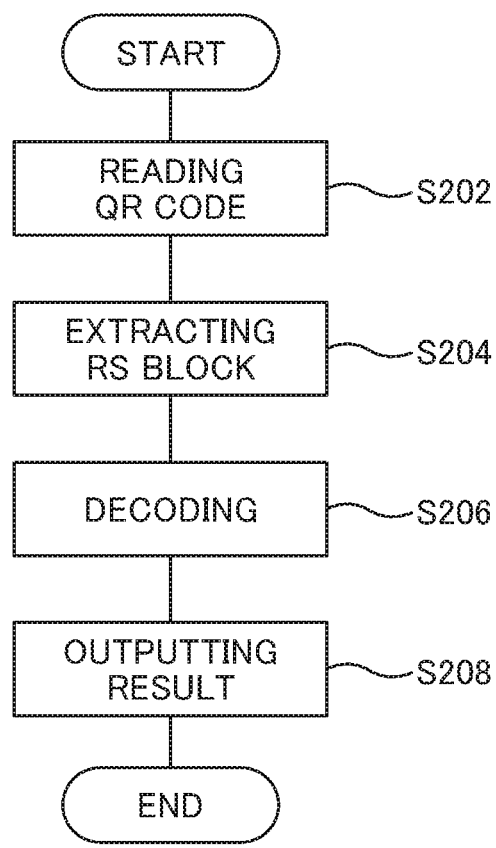
FIG. 9 is a flow chart of a method for reading a QR code symbol according to the first embodiment.

FIG. 9 is a flow chart of a method for reading a QR code symbol according to the first embodiment. In the following description, unless otherwise stated, a procedure for decoding the QR code symbol 1 is a procedure in conformance with JIS is employed.

The first embodiment assumes that the storage section 21b of the decoder 20 stores the "length (the number of words) information" of conceal-information words, and "offset information" indicating the beginning position at which replacement with the conceal-information words starts.

First, the QR code symbol 1 is read (S202). Then, a plurality of RS blocks is expanded based on the read QR code symbol 1 (S204). Concerning expansion of the plurality of RS blocks, anything in conformance with JIS may be employed. Accordingly, for example, a replaced RS block shown in the FIG. 7 is acquired.

Next, the codewords and the conceal-information words of the original data are extracted from the acquired replaced RS block (S206).

Figure 10:
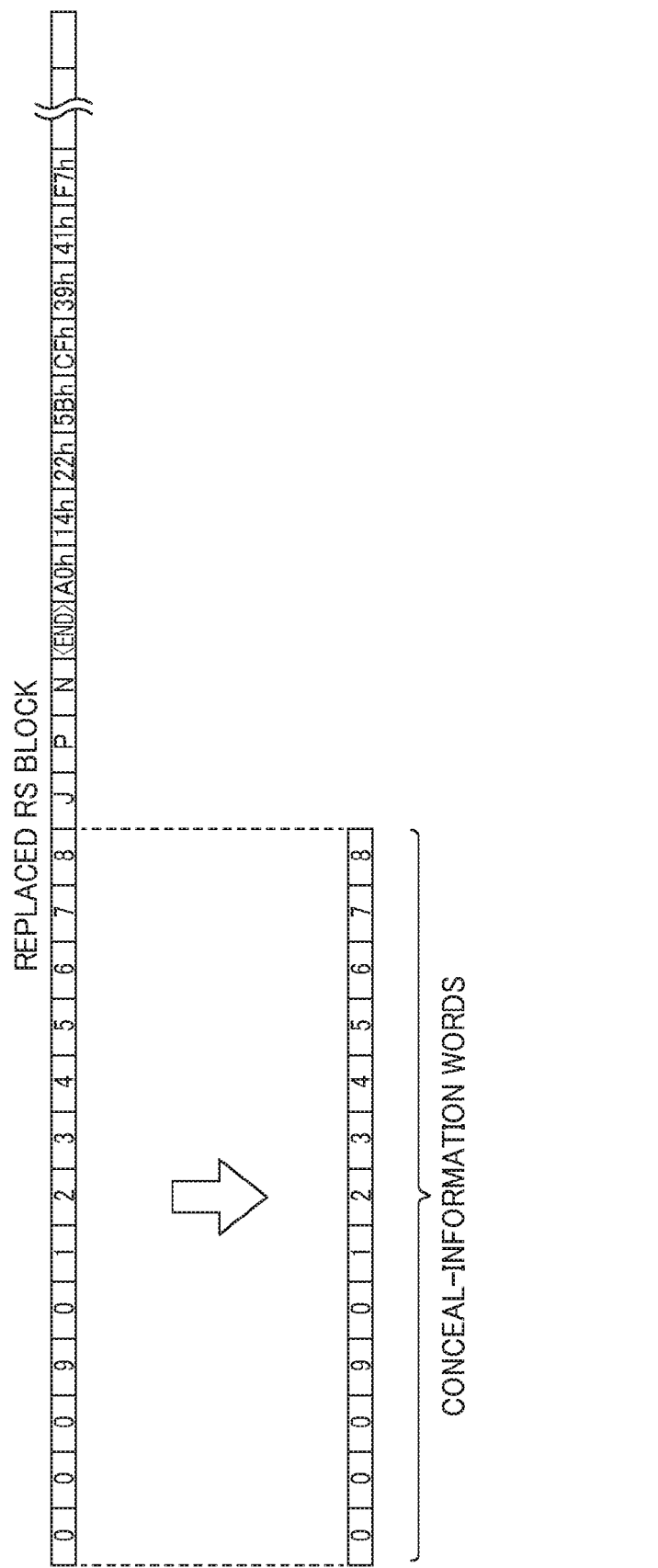
FIG. 10 is a diagram illustrating a method for extracting conceal-information words.

FIG. 10 is a diagram illustrating a method for extracting conceal-information words. FIG. 10 shows a replaced RS block and conceal-information words.

The replaced RS block can be acquired by reading and expanding the QR code symbol in conformance with JIS, as mentioned above. The decoder 20 identifies the positions of the conceal-information words in the replaced RS block, based on the offset information and the length information of the conceal-information words, both information being stored in the storage section 21b. The conceal-information words are extracted from the identified positions.

Figure 11:
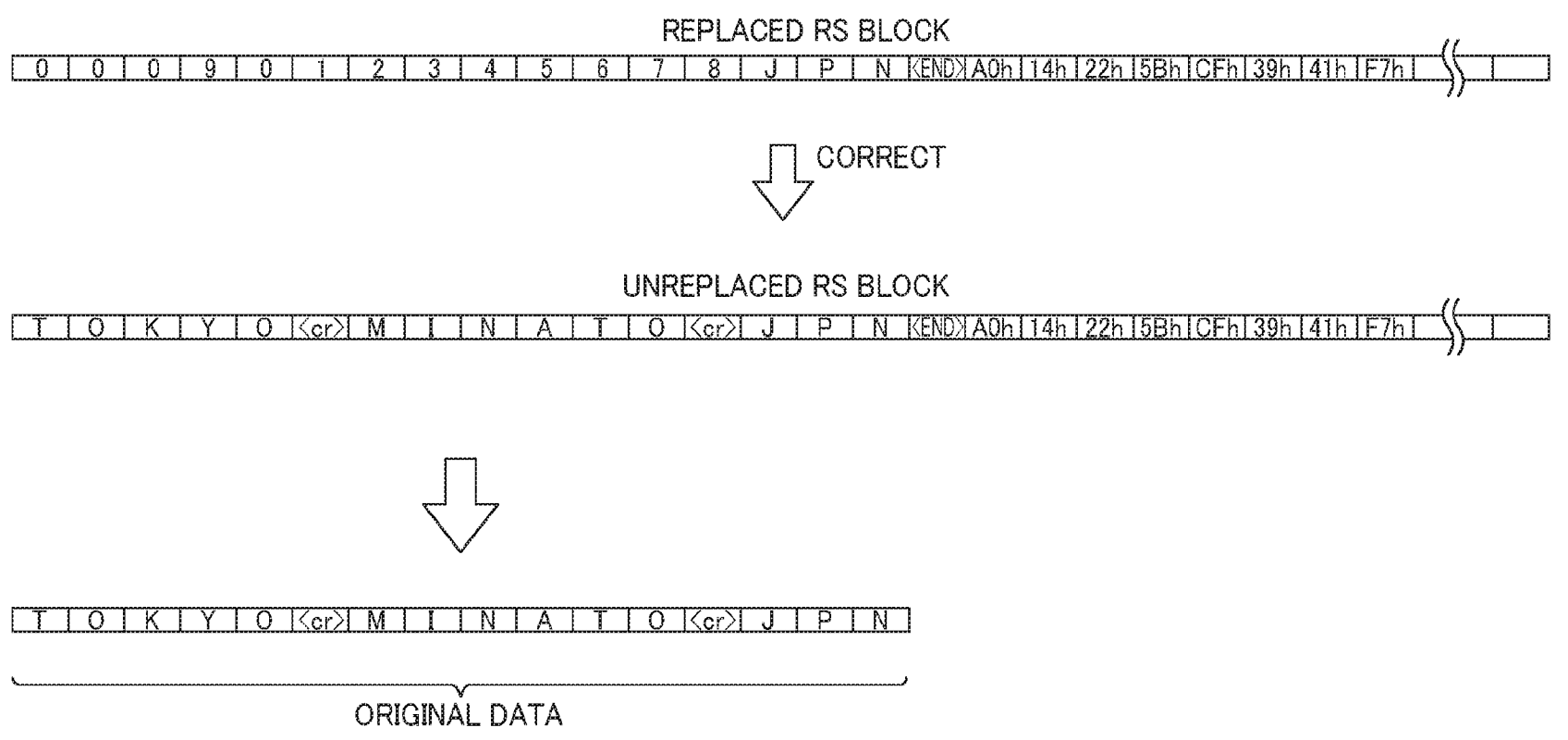

FIG. 11 is a diagram illustrating a method for extracting original data. The decoder 20 acquires an unreplaced RS block by performing error correction of the replaced RS block. The decoder 20 extracts information which is located from the initial end of the unreplaced RS block to a terminator, and the extract data will be treated as the original data.

Next, the obtained codewords of the original data and the conceal-information words are output (S208). These may be output to the display device 23 or to the printing device 24 such as a printer.

If the data codewords of the original data themselves are interleaved as mentioned above, the data codewords are subsequently sorted in a certain procedure so as to be in its original order. If the data codewords of the original data are encrypted, the original data is decoded in a certain decoding method.

Next, as an comparative example, an output result will be described in a case in which the standard decoder reads a QR code symbol 1 according to the first embodiment. When the standard decoder reads the QR code symbol 1, correction of the entire RS block is made according to the RS code of the replaced RS block. An original-data section is corrected, and the corrected original data is displayed by the standard decoder. Unlike the foregoing enhanced decoder 20, the standard decoder does not have a function to extract conceal-information words from the replaced RS block. Accordingly, the standard decoder can extract the original data only, and cannot extract the conceal-information words.

Further, as a comparative example, an output result will be described in a case in which a common QR code symbol is read by the enhanced decoder 20. When the enhanced decoder 20 reads a common QR code symbol, RS blocks can be acquired based on this. A RS block acquired from a common QR code symbol does not include conceal-information words. However, at the time of acquiring the RS block, the enhanced decoder 20 cannot judge whether or not the read symbol 1 is a QR code symbol according to the first embodiment or is a common QR code symbol.

Accordingly, as in the procedure according to the first embodiment, the enhanced decoder 20 extracts data codewords as conceal-information words, from the positions where the conceal-information words of a RS block are placed. Based on the RS code of the RS block, the entire RS block is subsequently corrected. Consequently, the original-data section is corrected, and the corrected original data is displayed by the enhanced decoder 20.

The codewords which have been read as conceal-information words are judged whether or not they are conceal-information words as follow. If the ratio of difference between a RS block before correction and a RS block after correction exceeds a predetermined value, it can be judged that the codewords which have been read are conceal-information words (that is, it can be judged that the QR code symbol is a QR code symbol according to the first embodiment). If the ratio of difference does not exceed the predetermined value, it can be judged that the codewords are not conceal-information words (that is, it can be judged that the QR code symbol is a common QR code symbol), and it is possible not to display conceal-information words. This is because the ratio of difference between an unreplaced RS block and a replaced RS block always exceeds a predetermined value if replacement with conceal-information words is performed.

As another comparative example, the following case will be considered: after a common QR code symbol is generated, graphic pattern is generated in only a part corresponding to specific conceal information and to overwrite the graphic pattern. In this case, after generating a two-dimensional pattern, a specific graphic pattern is generated. Accordingly, a different system for generating such a specific graphic pattern is required. In addition, after generating a QR code symbol, a generation process for a graphic pattern to overwrite is needed. In terms of processing speed, the foregoing processes are not desirable because a plurality of processes for graphic-pattern generation are performed.

Unlike the comparative examples, in the first embodiment, the enhanced encoder 10 generates a replaced data block immediately after the enhanced encoder 10 generates an unreplaced data block at the data-codeword level. This process is performed on a memory (the storage section 11*b*) of a single system (the control section 11). Based on the foregoing replaced data block, a final process for generating a QR code symbol 1 is performed only once (S110). Since necessary processes are performed at the data-codeword level as mentioned above, the final process for generating a QR code symbol 1 can be performed more efficiently and at higher speed than in the foregoing case in which necessary processes are performed at graphic-pattern-generation level. These advantages exist also in the following embodiment.

Figure 12:
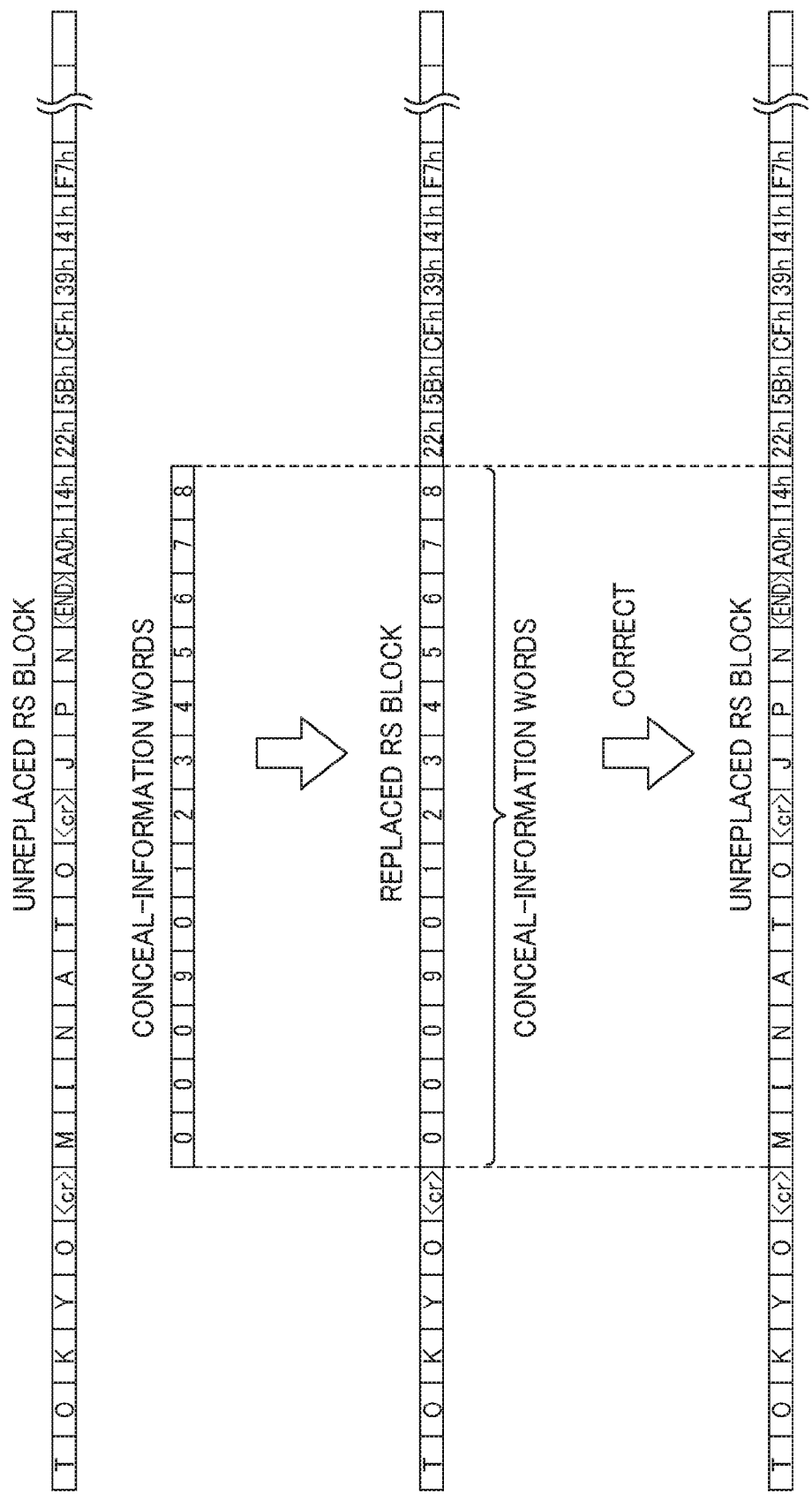
FIG. 12 is a second diagram illustrating how to replace a part of a RS block in a procedure according to the first embodiment.

FIG. 12 is a second diagram illustrating how to replace a part of a RS block in a procedure according to the first embodiment. In the foregoing procedure, the RS block is replaced sequentially from its initial word with conceal-information words. However, taking into consideration the correcting capability of Reed-Solomon code, any positions in the RS block may be replaced with conceal-information words.

In this case, it is possible to predetermine a position of the RS block at which replacement with the conceal-information words starts (how many words from the initial word to the position). For example, as shown in FIG. 12, a RS block may be replaced with 13 conceal-information words from the replacement start position, which is of the seventh word from the initial word. In this case, the storage section 11*b* of the enhanced encoder 10 and the storage section 21*b* of the enhanced decoder 20 store the offset information that the conceal-information words starts from the position of seventh word in the replaced RS block, the position having been predetermined. Also, these storage sections store length information that the length of the conceal-information words is 13 words. In this case, since the number of conceal-information words is smaller than the number of words which can be corrected with the RS code, correcting makes it possible to appropriately acquire an unreplaced RS block. It is possible to extract the original data from the unreplaced RS block.

In this case, the final end of the conceal-information words with which the RS block has been replaced may be defined by adding a certain separator to the final word of conceal-information words.

Figure 13:
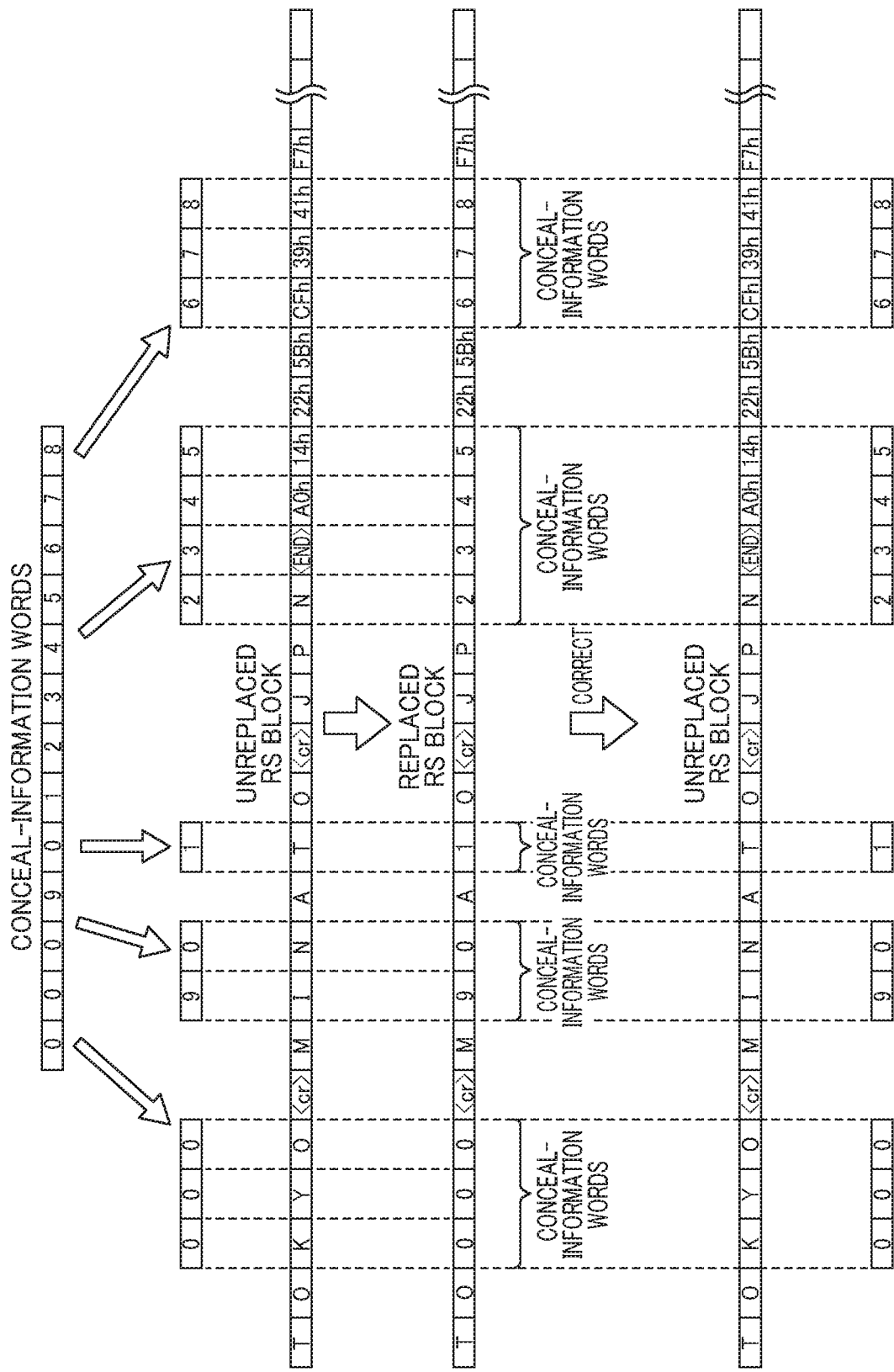
FIG. 13 is a third diagram illustrating how to replace a part of a RS block in a procedure according to the first embodiment.

FIG. 13 is a third diagram illustrating how to replace a part of a RS block in a procedure according to the first embodiment. In this example, parts of a RS block are replaced with conceal-information words which are divided into multiple parts.

In this case, it is possible to predetermine a plurality of positions from which the RS block is to be replaced with the parts of conceal-information words. For example, as shown in FIG. 13, the following replacements are acceptable. The RS block is replaced with three conceal-information words from a replacement start position, which is of 3rd word from the initial word. And, the RS block is replaced with two conceal-information words from a replacement start position, which is of eighth word from the initial word. And, the RS block is replaced with one conceal-information word from a replacement start position, which is of 11th word from the initial word. And, the RS block is replaced with four conceal-information words from a replacement start position, which is of 16th word from the initial word. And, the RS block is replaced with three conceal-information words from a replacement start position, which is of 22th word from the initial word.

In this case, the storage section 11*b* of the enhanced encoder 10 and the storage section 21*b* of the enhanced decoder 20 stores the foregoing information as the offset information and as the length information. Accordingly, the enhanced decoder 20 can extract each part of the conceal-information words from the corresponding positions, which are identified in advance. Also in this case, since the number of conceal-information words is smaller than the number of words which can be corrected with the RS code, correction allows the unreplaced RS block to be appropriately acquired. It is possible to extract the original data from the unreplaced RS block.

===Second Embodiment===

In the foregoing first embodiment, information of the positions of the offset information and the length information of conceal-information words is stored in advance in the storage section 11*b* of the enhanced encoder 10 and in the storage section 21*b* of the enhanced decoder 20 (the information of the positions is hereinafter referred to as placement information). In the second embodiment, placement information is stored in header data codewords (a "header" in the drawings). In addition, the header data codewords are contained in a replaced RS block in the second embodiment.

Figure 14:
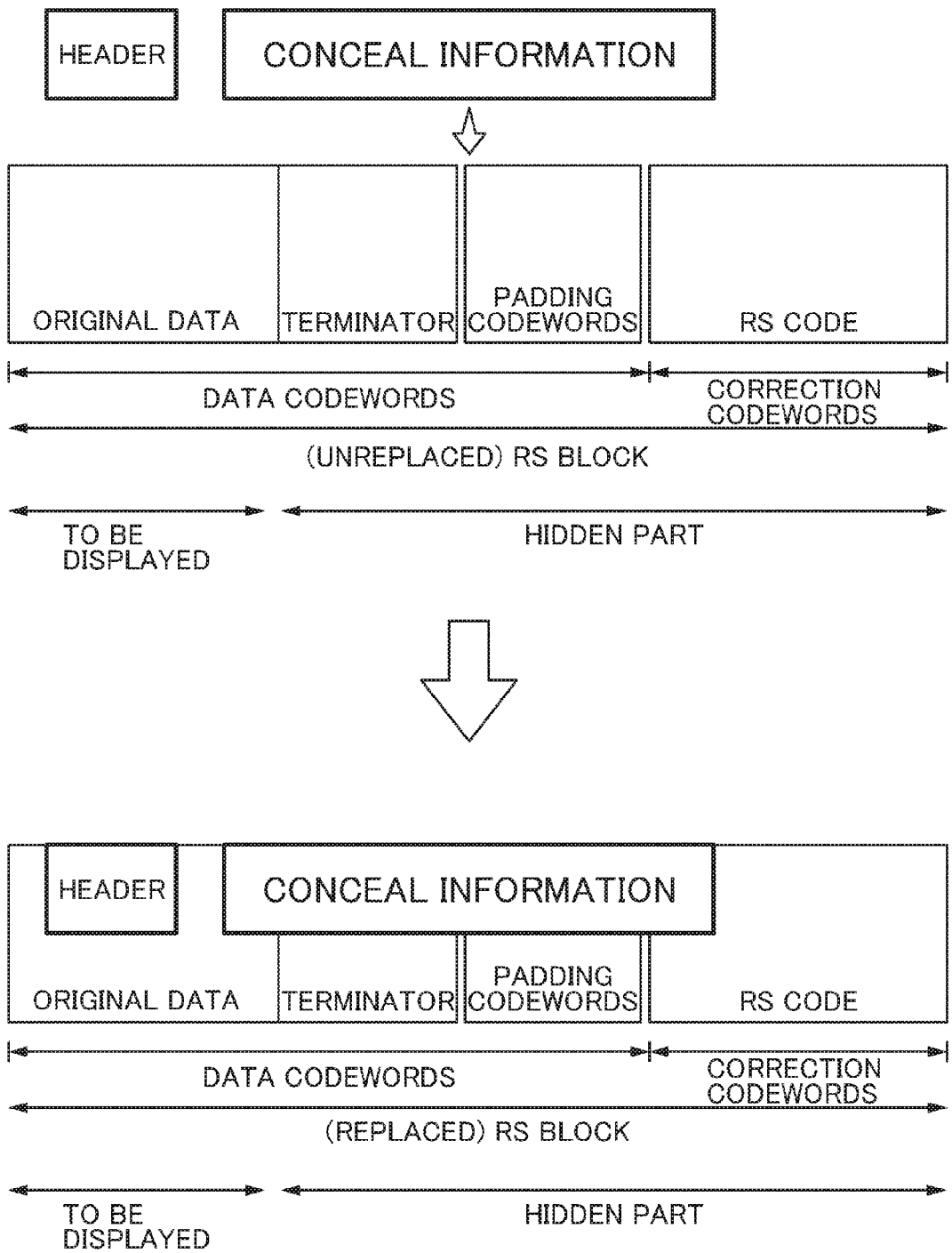
FIG. 14 is a conceptual diagram of a RS block according to the second embodiment.

FIG. 14 is a conceptual diagram of a RS block according to the second embodiment. As known from a comparison FIG. 14 with FIG. 3, which is according to the foregoing first embodiment, in the second embodiment, the enhanced encoder 10 replaces a part of an unreplaced RS block with header data codewords and conceal-information words, and generates a replaced RS block.

In the second embodiment, a replacement with the header data codewords and a replacement with the conceal-information words, both are performed so that the number of the replaced words does not exceed the number of error-correctable words in the RS block. That is, the total number of the header data codewords and the conceal-information words does not exceed the number of error-correctable words in the RS block.

The header data codewords shown in FIG. 14 contains placement information of the conceal-information words, as mentioned above. Accordingly, with reference to the header data codewords, it is possible to locate the beginning position of the conceal-information words and its length (the number of words). The positions of the header data codewords are predetermined. In addition, the header data codewords can contain information related to the format of the conceal-information words. Information related to the format of the conceal-information words contains the following types of information: information of a cryptographic key which is used if the conceal-information words are encrypted; and information of sorting which is performed if the conceal-information words are interleaved. If the conceal-information words are encoded for the purpose of error detection or error correction, information of a procedure for error detection or error correction is also contained.

Figure 15:
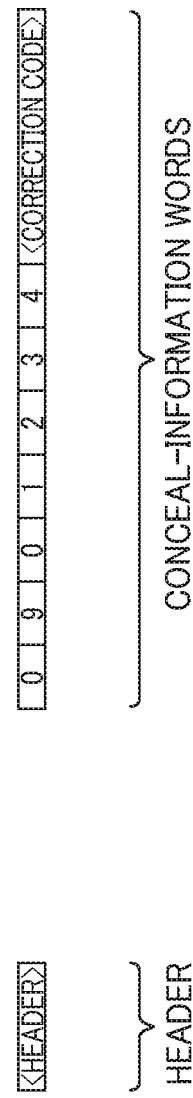
FIG. 15 is a diagram illustrating a header and conceal-information words according to the second embodiment.

FIG. 15 is a diagram illustrating header data codewords and conceal-information words according to the second embodiment. FIG. 15 shows the header data codewords and the conceal-information words, and also shows that the conceal-information words contain correction-code words.

Figure 16:
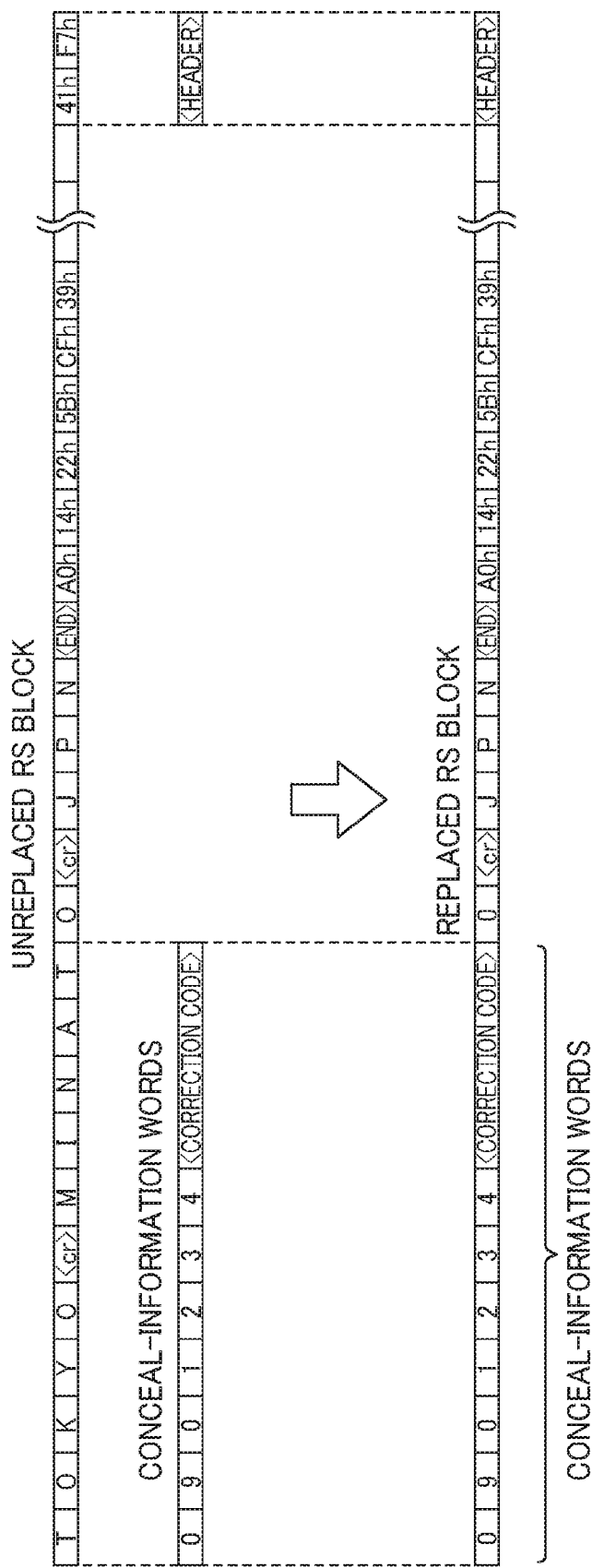
FIG. 16 is a first diagram illustrating how to replace a part of a RS block in a procedure according to the second embodiment.

FIG. 16 is a first diagram illustrating how to replace a part of a RS block in a procedure according to the second embodiment. FIG. 16 shows a RS block, conceal-information words, and header data codewords. In this example, as shown in FIG. 16, the RS block is replaced from its initial word with the conceal-information words by the enhanced encoder 10. The final end part of the RS block is replaced with the header data codewords. The header data codewords contains placement information of the conceal-information words (in this case, information that the beginning of the conceal-information words is the initial word of the RS block (zero offset), and information that the length is 11 words).

If a part of a RS block is replaced with the conceal-information words as mentioned above, a part of the original data and a part of the correction codewords are lost. However, correction can be made for each of RS blocks. Accordingly, using a RS code, the standard decoder can correct the original-data section which has been replaced. And, the standard decoder can appropriately extract and display the original-data section. The part which is replaced with the conceal-information words is treated as information which is considered as an error and which is discarded, the error being an error caused by contamination of the QR code symbol 1 or the like. Consequently, the standard decoder cannot display the conceal-information words.

On the other hand, the enhanced decoder 20 extracts the conceal-information words from the replaced RS block. And, the enhanced decoder 20 acquires from the header data codewords, placement information which is for locating the positions of the conceal-information words. Based on the placement information, the conceal-information words are extracted. Since the correction-code words are added to the conceal-information words, the contaminated conceal-information words can be corrected using the correction-code words.

If the conceal-information words are interleaved, the conceal-information words can be sorted in its original order based on the information of an interleaving procedure contained in the header data codewords. Also, if the original data is interleaved, the original data can be sorted in its original order based on the information of an interleaving procedure contained in the header data codewords. If the conceal-information words are encrypted, the conceal-information words can be decoded based on a cryptographic key contained in the header data codewords or the like. As mentioned above, if the conceal-information words are encoded for the purpose of error detection or error correction (for example, coded into a RS code), a procedure for correcting an error can be specified based on information contained in the header data codewords.

After the conceal-information words are extracted as mentioned above, the enhanced decoder 20 corrects the replaced RS block and obtains an unreplaced RS block. Then, the original-data section contained in the unreplaced RS block is extracted. And, the conceal-information words and the original-data section which have been extracted are displayed.

Figure 17:
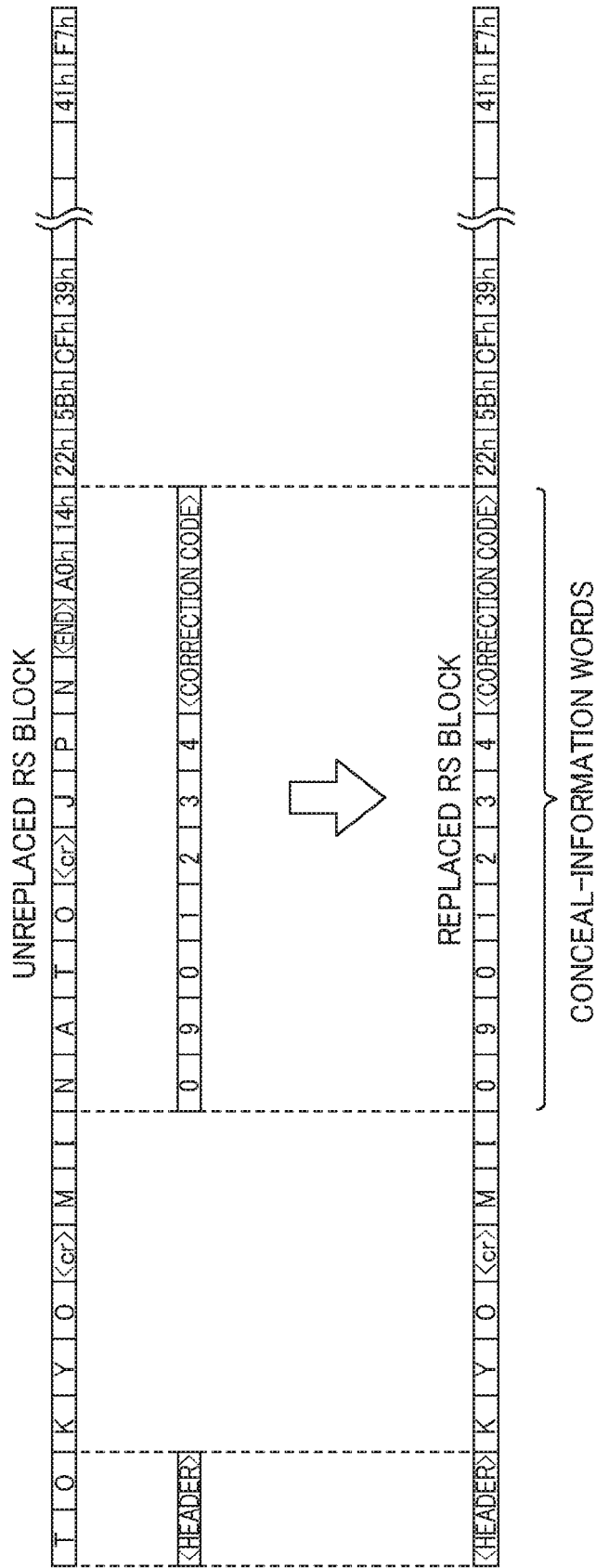
FIG. 17 is a second diagram illustrating how to replace a part of a RS block in a procedure according to the second embodiment.

FIG. 17 is a second diagram illustrating how to replace a part of a RS block in a procedure according to the second embodiment. In the procedure shown in FIG. 16, the RS block is replaced sequentially from its initial word with conceal-information words. However, as shown in FIG. 17, the RS block may be replaced, from any position which is not of the initial word, with conceal-information words.

In a case shown in FIG. 17, offset information in the header data codewords contains that the RS block is replaced with the conceal-information words from the 9th word of the RS block. Also, length information in the header data codewords contains that the length of the conceal-information words is 11 words. This makes it possible to appropriately extract the conceal-information words by referring the header data codewords, as in the first embodiment.

This also can be applied to a case in which the RS block is replaced with separated conceal-information words as shown in the foregoing FIG. 13.

Figure 18:
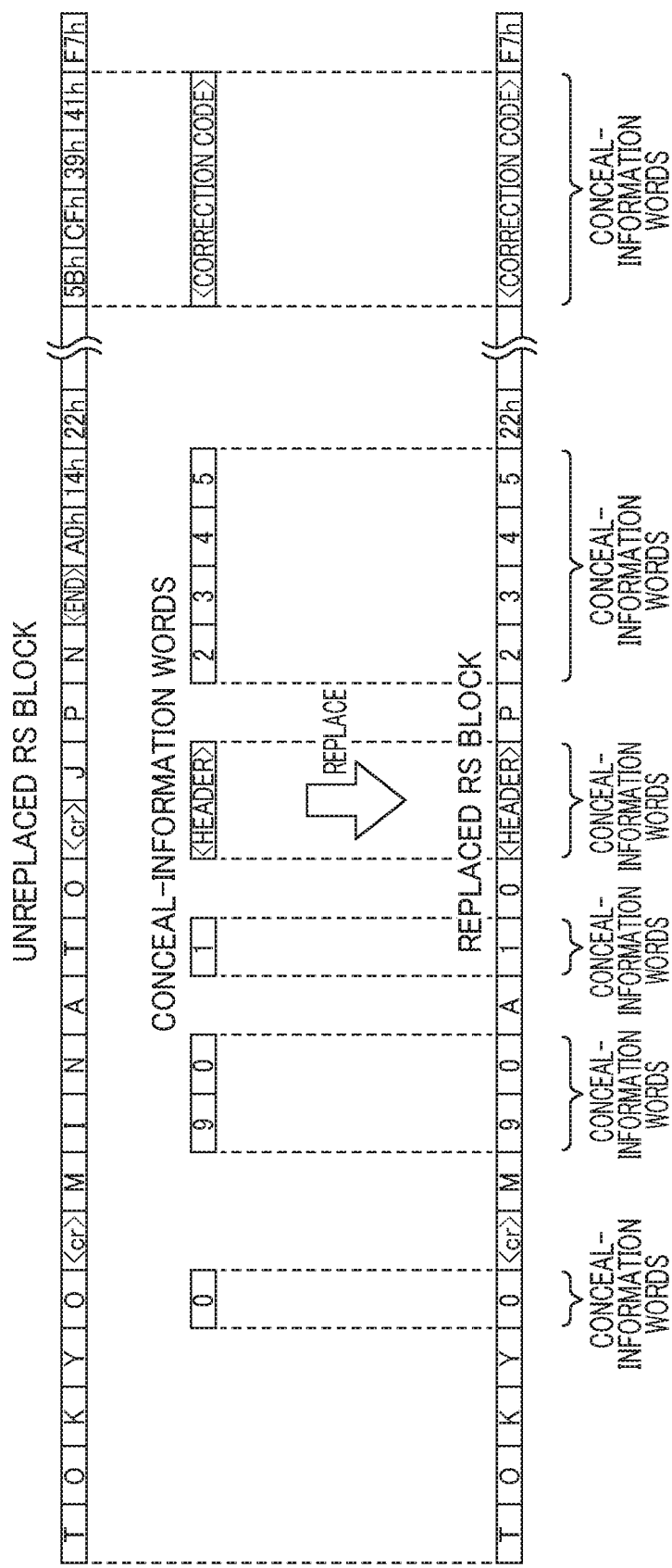
FIG. 18 is a third diagram illustrating how to replace a part of a RS block in a procedure according to the second embodiment.

FIG. 18 is a third diagram illustrating how to replace a part of a RS block in a procedure according to the second embodiment. In this example, it is predetermined that the beginning position of the header data codewords is the 13th word of the RS block, and it is predetermined that the length of the header data codewords is two words. If the RS block is replaced with the separated conceal-information words as mentioned above, the header data codewords contain a plurality of pieces of placement information of the conceal-information words. This makes it possible to appropriately extract the conceal-information words with reference to the header data codewords.

In the foregoing description, the positions of the header data codewords are predetermined. However, the positions of the header data codewords may be indicated by delimiters which are respectively placed adjacent to the header data codewords on both sides of the header data codewords.

Concerning whether the read QR code symbol is a common QR code symbol or is a QR code symbol according to the second embodiment, the judgment can be made based on whether or not the extracted conceal-information words include header data codewords. That is, since a QR code symbol according to the second embodiment contains header data codewords, the enhanced decoder 20 can display conceal-information words. On the other hand, since a common QR code symbol does not contain a header data codeword, the enhanced decoder 20 can display only information to be displayed without displaying the conceal-information word.

===Third Embodiment===

Figure 19:
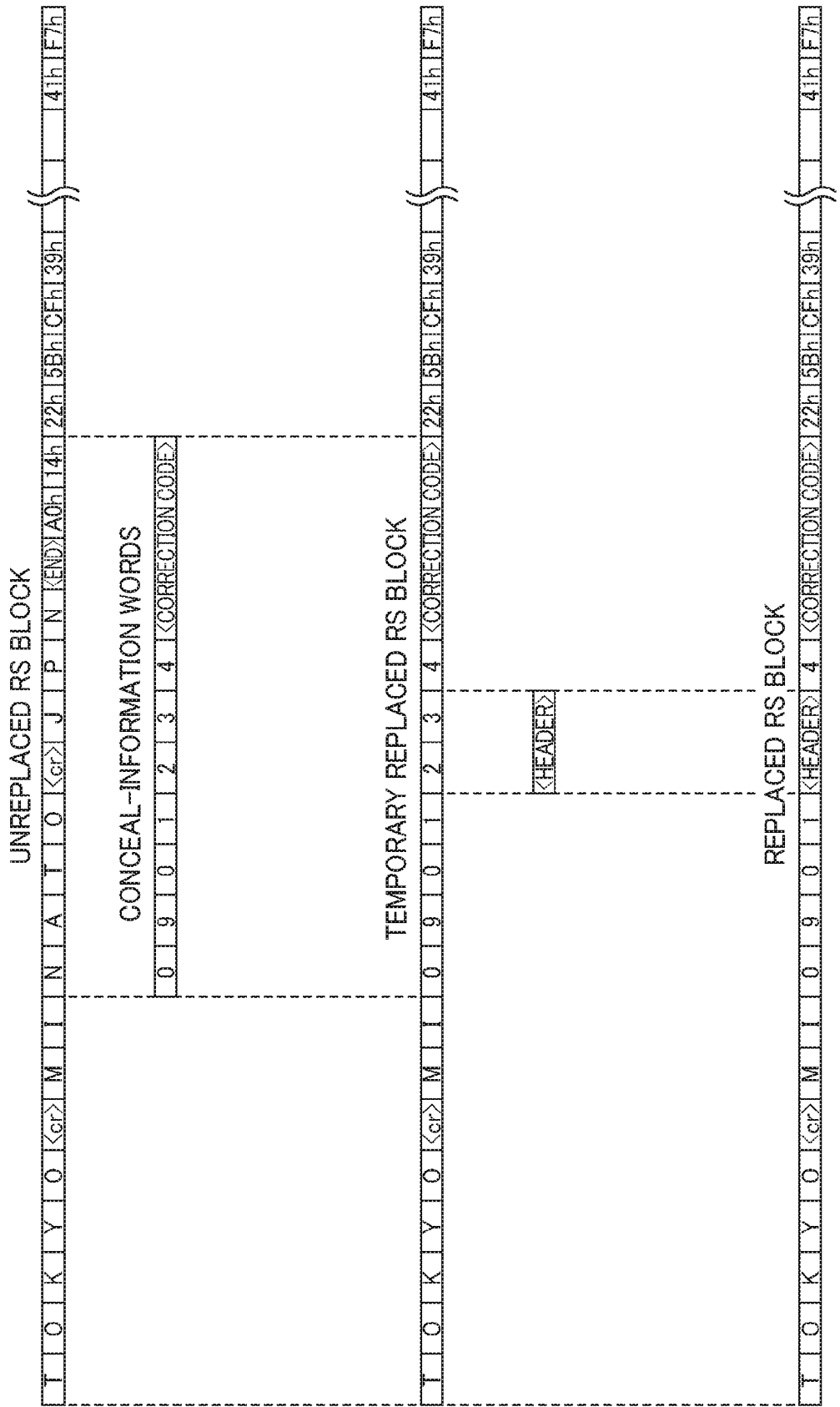
FIG. 19 is a diagram illustrating how to replace a part of a RS block in a procedure according to the third embodiment.

FIG. 19 is a diagram illustrating how to replace a part of a RS block in a procedure according to the third embodiment. FIG. 19 shows an unreplaced RS block, conceal-information words, a temporary replaced RS block, header data codewords and a replaced RS block.

In the third embodiment, the enhanced encoder 10 replaces a part of the unreplaced RS block with the conceal-information words, and generates the temporary replaced RS block. The conceal-information words include the correction-code words, which have a correcting capability sufficiently to correct words replaced with the header data codewords, as described later.

Next, the enhanced encoder 10 replaces a part of the temporary replaced RS block with the header data codewords, the part of the temporary replaced RS block being a part of the replaced words which have been replaced with the conceal-information words. And, the enhanced encoder 10 generates the replaced RS block. Subsequently, the enhanced encoder 10 generates a QR code symbol based on the generated replaced RS block.

Next, a decoding procedure will be described. The enhanced decoder 20 according to the third embodiment reads a QR code symbol generated as mentioned above, and expands a replaced RS block. Then, the enhanced decoder 20 extracts the header data codewords. The positions of the header data codewords may be predetermined as in the first embodiment and the second embodiment. Also, the positions of the header data codewords may be indicated by delimiters which are respectively placed adjacent to the header data codewords on both sides of the header data codewords.

Based on placement information contained in the header data codewords which has been extracted as mentioned above, the positions of the conceal-information words are identified, and then the conceal-information words are extracted. Since the conceal-information words contains correction-code words as mentioned above, correction based on the correction-code words allows to appropriately correct a part which has been replaced with the header data codewords. Thus, the conceal-information words before being replaced with header data codewords are appropriately extracted.

This makes it possible to acquire a temporary replaced RS block. Next, the decoder 20 performs a correcting operation using correction-code words, the correction-code word being included in the unreplaced RS block. Thus, a part replaced with the conceal-information word is appropriately corrected, and the unreplaced RS block can be acquired. Then, the enhanced decoder 20 can extract the original data from the unreplaced RS block.

In the third embodiment, the number of conceal-information words does not exceed the number of words which can be corrected with correction-code words included in the unreplaced RS block. In the third embodiment, the number of header data codewords does not exceed the number of words which can be corrected with correction-code words contained in the conceal-information words. This makes it possible to extract appropriately the conceal-information word and the original data.

In the third embodiment, a part of replaced words which have been replaced with the conceal-information words is replaced with header data codewords. For this reason, the header data codewords overlap the conceal-information words. Accordingly, the total length of the header data codewords and the conceal-information words can be reduced. This makes it possible to increase reserve capability for detecting and correcting an error of the QR code symbol.

In the third embodiment, as in the second embodiment, concerning whether the read QR code symbol is a common QR code symbol or is a QR code symbol according to the third embodiment, the judgment can be made based on whether or not the extracted conceal-information words include header data codewords. That is, since a QR code symbol according to the third embodiment contains header data codewords, the enhanced decoder 20 can display conceal-information words. On the other hand, since a common QR code symbol does not contain header data codewords, the enhanced decoder 20 can display only information to be displayed without displaying conceal-information words.

===Fourth Embodiment===

Figure 20:
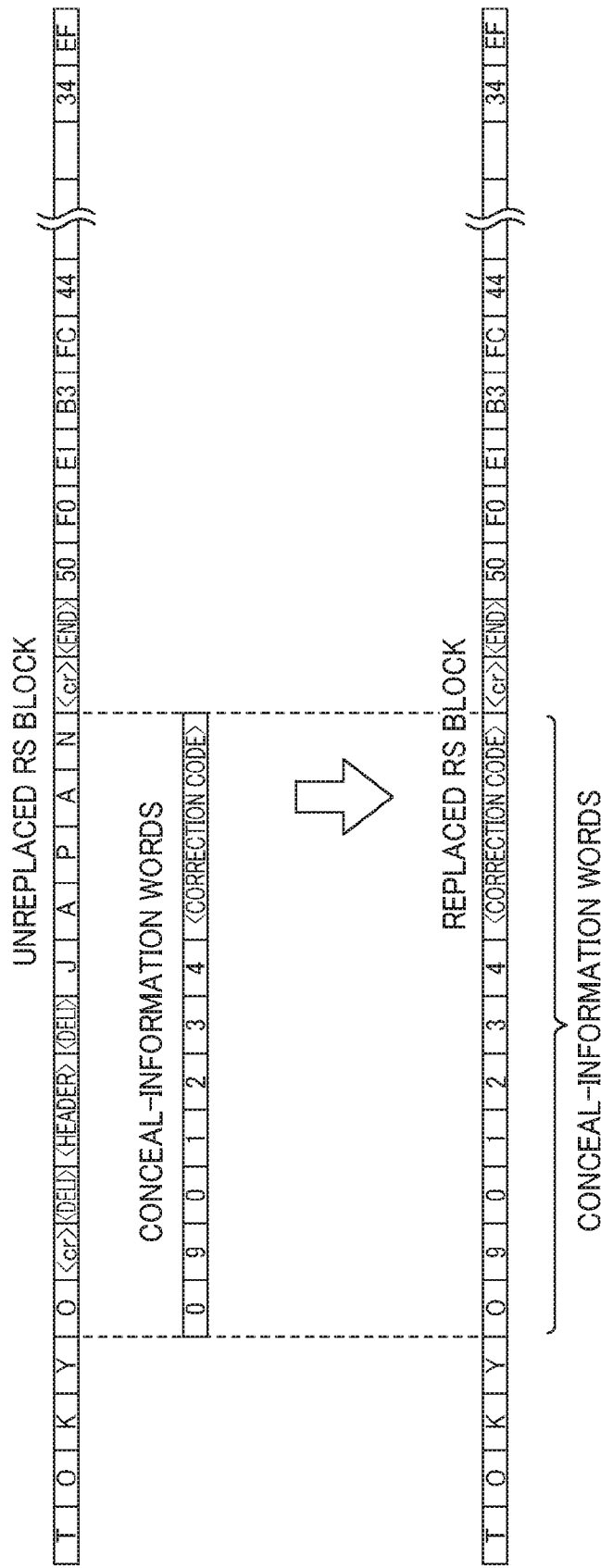
FIG. 20 is a diagram illustrating how to replace a part of a RS block in a procedure according to the fourth embodiment.

FIG. 20 is a diagram illustrating how to replace a part of a RS block in a procedure according to the fourth embodiment. FIG. 20 shows an unreplaced RS block, conceal-information words and a replaced RS block.

In the fourth embodiment, the original data of the unreplaced RS block contains header data codewords. Delimiters (each indicated as "<deli>" in FIG. 20) are placed adjacent to the header data codewords on both sides of the header data codewords. These delimiters separate information to be displayed and the header data codewords in the original data.

In order to generate the foregoing unreplaced RS block, in the fourth embodiment, the enhanced encoder 10 generates original data, which includes information to be displayed, header data codewords, and delimiters. The header data codewords contain the placement information of conceal-information words (to be described later). The enhanced encoder 10 generates the correction codewords based on the original data composed of them (including padding codewords, if any). And, the enhanced encoder 10 generates the unreplaced RS block.

Next, the enhanced encoder 10 replaces a part of the unreplaced RS block with the conceal-information words. The replacement positions are positions corresponding to the placement information, which is contained in the header data codewords. The enhanced encoder 10 generates the replaced RS block. Subsequently, the enhanced encoder 10 generates a QR code symbol based on the replaced RS block.

Next, a decoding procedure will be described. The enhanced decoder 20 according to the fourth embodiment reads a QR code symbol generated as mentioned above, and expands a replaced RS block. Then, the enhanced decoder 20 corrects the replaced RS block based on the correction-code words which are included in the unreplaced RS block, and thereby an unreplaced RS block can be acquired. The unreplaced RS block includes the header data codewords separated by the delimiters, as mentioned above. The enhanced decoder 20 locates the positions of the conceal-information words and extracts the conceal-information words from the replaced RS block based on the placement information, the placement information being included in the header data codewords. The extracted conceal-information words may be corrected using the correction-code words which are included in the conceal-information words.

Header data codewords, which contain the placement information of conceal-information words, are replaced with conceal-information words as mentioned above, and the replaced RS block is consequently generated. This makes it difficult to locate the positions of conceal-information words in the replaced RS block. This can make it more difficult for a third party to extract conceal-information words.

In the fourth embodiment, concerning whether the read QR code symbol is a common QR code symbol or is a QR code symbol according to the fourth embodiment, the judgment can be made based on whether or not the extracted unreplaced RS block includes header data codewords. That is, since the unreplaced RS block according to the fourth embodiment includes header data codewords, the enhanced decoder 20 can display conceal-information words. On the other hand, since a common QR code symbol does not include header data codewords, the enhanced decoder 20 can display only information to be displayed without displaying the conceal-information words.

===Fifth Embodiment===

Figure 21:
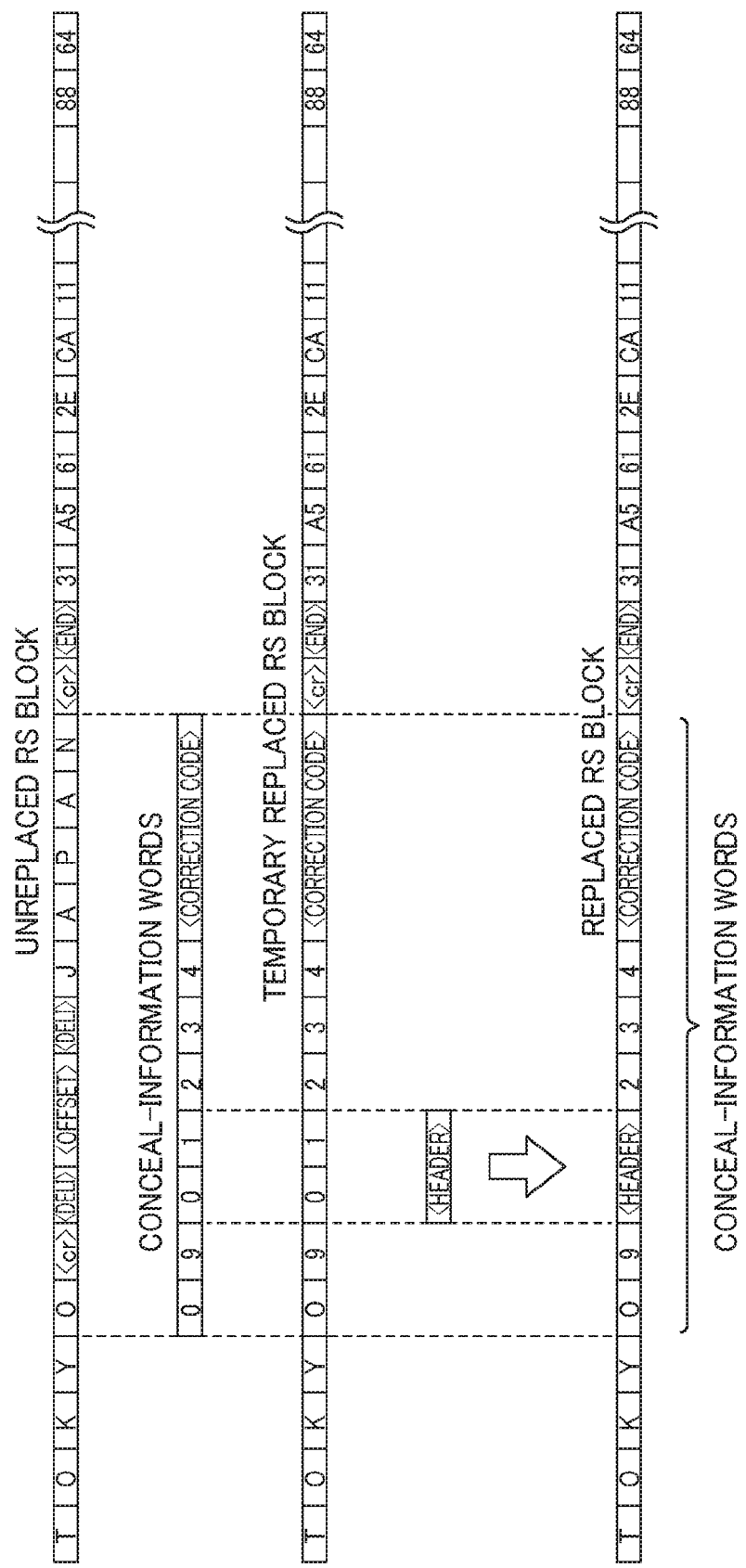
FIG. 21 is a diagram illustrating how to replace a part of a RS block in a procedure according to the fifth embodiment.

FIG. 21 is a diagram illustrating how to replace a part of a RS block in a procedure according to the fifth embodiment. FIG. 21 shows an unreplaced RS block, conceal-information words, header data codewords and a replaced RS block.

In the fifth embodiment, the original data of the unreplaced RS block contains header-offset-position-information words, which contain the position information of header data codewords (indicated as "<OFFSET>" in FIG. 21 and corresponding to the "header-position-data codeword"). Delimiters are respectively placed adjacent to the header-offset-position-information words on both sides of the header-offset-position-information words. These delimiters separate information to be displayed and the header-offset-position-information words in the original data.

In order to generate the foregoing unreplaced RS block, in the fifth embodiment, the enhanced encoder 10 generates original data, which includes information to be displayed, header-offset-position-information words, and delimiters. The enhanced encoder 10 generates the correction codewords based on the original data composed of them (including padding codewords, if any). And, the enhanced encoder 10 generates the unreplaced RS block.

Next, the enhanced encoder 10 replaces a part of an unreplaced RS block with conceal-information words. The replacement positions are positions corresponding to the placement information of the conceal-information words, the placement information being contained in the header data codewords. In this example, the placement information of conceal-information words contains information that replacement with the conceal-information words starts from the fifth word of the RS block, and that the length of the conceal-information words is 11 words. And, the enhanced encoder 10 generates a temporary replaced RS block.

Next, the enhanced encoder 10 replaces with the header data codewords a part of the conceal-information words in the temporary replaced RS block. The replacement positions are positions corresponding to the position information of the header data codewords, the position information being contained in the header-offset-position-information words.

In this example, the header-offset-position-information words contain information that replacement is performed from the seventh word of the RS block. The length of the header data codewords is set to two words in advance. Based on these pieces of information, the enhanced encoder 10 replaces the RS block with the header data codewords, and the enhanced encoder 10 generates the replaced RS block. Subsequently, the enhanced encoder 10 generates a QR code symbol based on the replaced RS block.

Next, a decoding procedure will be described. The enhanced decoder 20 according to the fifth embodiment reads a QR code symbol generated as mentioned above, and expands a replaced RS block. Then, the enhanced decoder 20 corrects the replaced RS block based on correction-code words which are included in the RS block, and thereby an unreplaced RS block can be acquired. The unreplaced RS block includes the header-offset-position-information words separated by the delimiters, as mentioned above.

Based on the header-offset-position-information words, the enhanced decoder 20 locates the positions of the header data codewords in the replaced RS block. The enhanced decoder extracts the header data codewords from the located positions in the replaced RS block, and thereby the placement information of the conceal-information word can be acquired.

The enhanced decoder 20 extracts the conceal-information words from the replaced RS block based on the placement information of the conceal-information words. However, a part of the conceal-information words is replaced with the header data codewords. Accordingly, the enhanced decoder 20 performs correction based on the correction-code words, the correction-code words being contained in the conceal-information words. Consequently, the conceal-information words before being replaced with the header data codewords can be acquired. This makes it possible to acquire appropriately conceal-information words.

Further, the enhanced decoder 20 acquires information words which are obtained by removing the header-offset-position-information words and delimiters from the original data of the unreplaced RS block.

Thus, the header-offset-position-information words, which indicate the positions of the header data codewords, are contained in the original data. In addition, the header-offset-position-information words are replaced with the conceal-information words. These make it more difficult to locate the positions of the conceal-information words. Accordingly, it can be more difficult for a third party to extract the conceal-information words.

As in the foregoing second embodiment, any positions in the RS block may be replaced with the conceal-information words based on the placement information of the conceal-information words, the placement information being contained the header data codewords. In addition, the RS block may be replaced with the conceal-information words which are divided into multiple parts. It is possible to encrypt or interleave the conceal-information words, based on information of the header data codewords.

Though the positions of the header data codewords is located based on "offset", the positions of the header data codewords may be located in another procedure.

In the fifth embodiment, as in the second embodiment, concerning whether the read QR code symbol is a common QR code symbol or is a QR code symbol according to the fifth embodiment, the judgment can be made based on whether or not the extracted conceal-information words include header data codewords. That is, since a QR code symbol according to the fifth embodiment contains header data codewords, the enhanced decoder 20 can display conceal-information words. On the other hand, since a common QR code symbol does not contain header data codewords, the enhanced decoder 20 can display only information to be displayed without displaying the conceal-information words.

===Sixth Embodiment===

Figure 22:
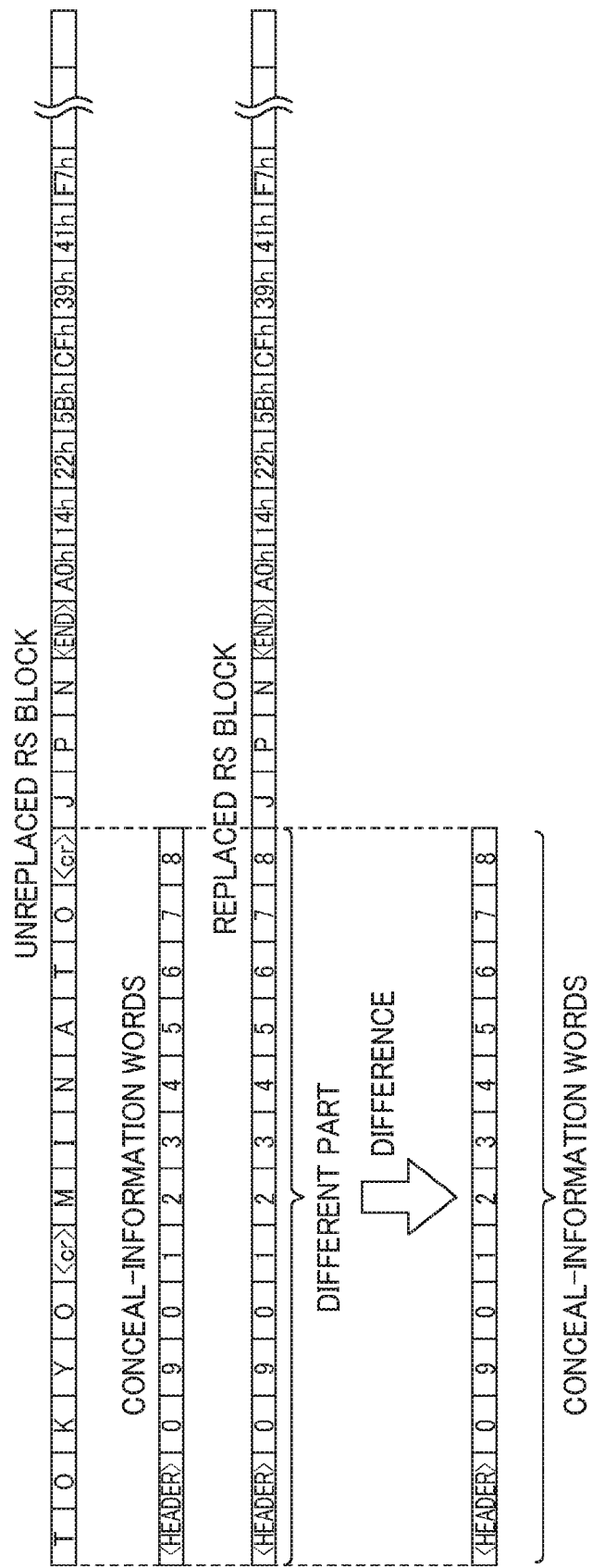
FIG. 22 is a first diagram illustrating how to replace a part of a RS block in a procedure according to the sixth embodiment.

FIG. 22 is a first diagram illustrating how to replace a part of a RS block in a procedure according to the sixth embodiment. FIG. 22 shows an unreplaced RS block, conceal-information words and a replaced RS block.

In the sixth embodiment, the enhanced encoder 10 generates the correction codewords based on original data (including padding codewords, if any). And, the enhanced encoder 10 generates the unreplaced RS block. Next, the enhanced encoder 10 replaces a part of the unreplaced RS block with the conceal-information words. Then, the enhanced encoder generates the replaced RS block, and generates a QR code symbol based on the replaced RS block. Thus, in the sixth embodiment, a method for generating a QR code symbol has almost the same procedure as in the first embodiment.

Next, a decoding procedure will be described. The enhanced decoder 20 according to the sixth embodiment reads the QR code symbol generated as mentioned above, and expands the replaced RS block. The enhanced decoder 20 corrects the replaced RS block based on the correction-code words, which is included in the RS block, and thereby the unreplaced RS block is acquired.

The enhanced decoder 20 compares the unreplaced RS block with the replaced RS block. Then, the enhanced decoder 20 extracts a part of the replaced RS block, the part being different from the unreplaced RS block. The information words extracted as mentioned above serve as the conceal-information words. The original data is extracted from the unreplaced RS block. Since a terminator is placed in the unreplaced RS block between the original data and the correction-code words, the decoder 20 can separate the original data and the correction-code words according to the terminator.

This makes it possible to extract the conceal-information words and the original data. With a procedure according to the sixth embodiment, it is sufficient that a comparison is merely made between the unreplaced RS block and the replaced RS block to extract a part having a difference. Accordingly, it is not advantageously necessary to provide the placement information of the conceal-information words. That is, if the header data codewords are used, the number of the header data codewords can decrease.

Figure 23:
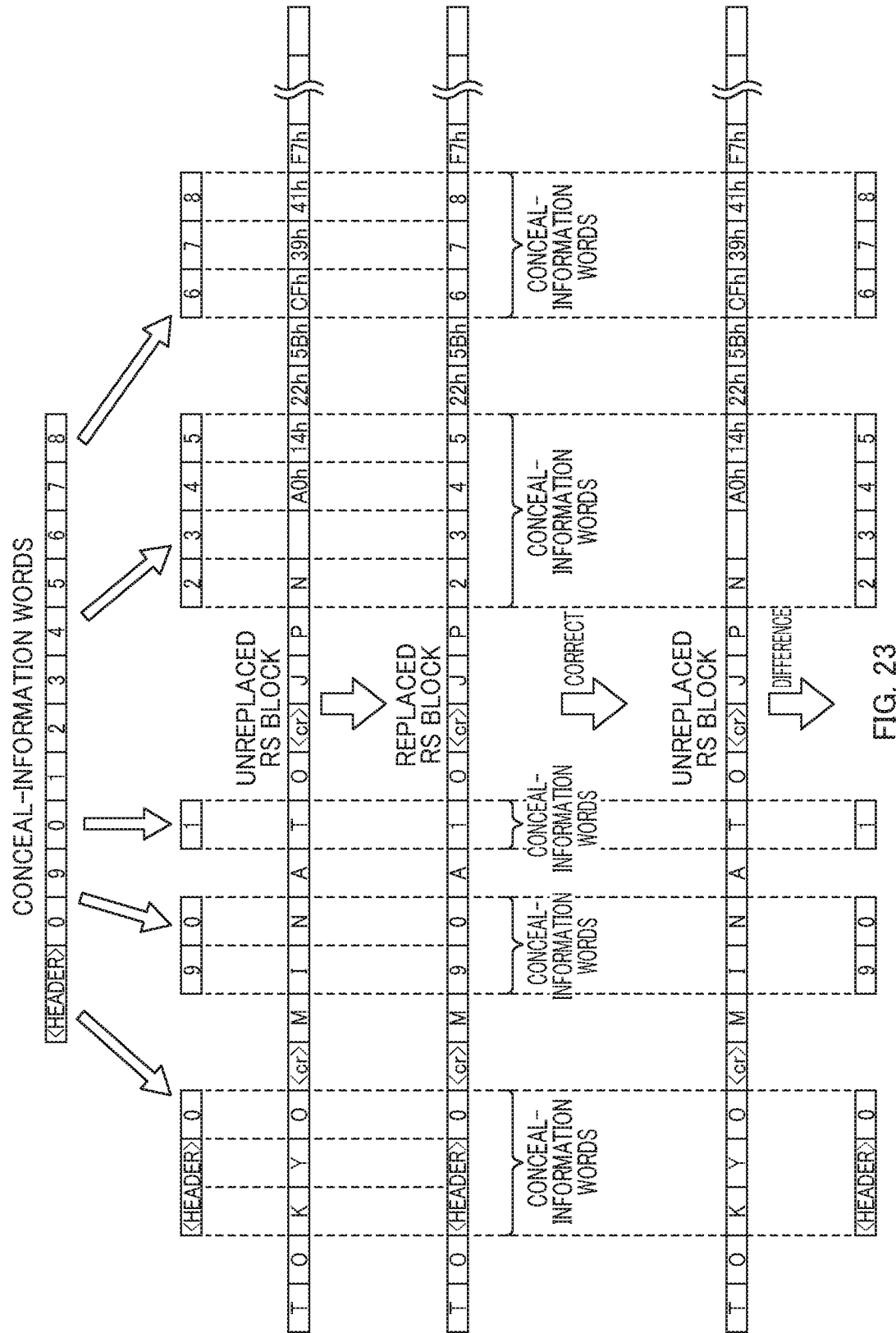
FIG. 23 is a second diagram illustrating how to replace a part of a RS block in a procedure according to the sixth embodiment.

FIG. 23 is a second diagram illustrating how to replace a part of a RS block in a procedure according to the sixth embodiment. In this example, parts of a RS block are replaced with conceal-information words which are divided into multiple parts.

For example, as shown in FIG. 23, the conceal-information words can be divided into five parts and parts of RS block can be replaced with them. In this case, since the number of the conceal-information words is smaller than the number of words which can be corrected with the RS code, it is possible to appropriately acquire the unreplaced RS block by performing correction. In this case, it is possible to acquire the conceal-information words by obtaining the difference between the unreplaced RS block and the replaced RS block. And, the original data can be acquired by extracting data words from the positions in the unreplaced RS block, which are identified in advance.

The foregoing procedure in which the conceal-information words are extracted based on the difference is effective, in particular, in cases in which a QR code symbol and its RS blocks are less likely to be contaminated. For example, in cases in which an image data file of a QR code symbol is generated and then the file is retrieved to extract conceal-information words, the QR code symbol will not be contaminated because there is no chance that the QR code symbol is exposed outside.

The foregoing procedure has an advantage that conceal-information words can be identified without providing a header data codeword or the like. This makes it possible to replace a RS block with more conceal-information words.

As in the first embodiment, the codewords which have been read as conceal-information words are judged whether or not they are conceal-information words as follow. If the ratio of difference between a RS block before correction and a RS block after correction exceeds a predetermined value, it can be judged that the codewords which have been read are conceal-information words (that is, it can be judged that the QR code symbol is a QR code symbol according to the sixth embodiment). If the ratio of difference does not exceed the predetermined value, it can be judged that the codewords are not conceal-information words (that is, it can be judged that the QR code symbol is a common QR code symbol), and it is possible not to display conceal-information words. This is because the ratio of difference between an unreplaced RS block and a replaced RS block always exceeds a predetermined value if replacement with conceal-information words is performed.

If decoding is performed based on the difference in the foregoing procedure, there is a problem that a part of an unreplaced data block will not be extracted as a difference, which is accidentally identical to a part of a replaced data block which has been replaced with conceal-information words (but, this is extremely rare). In this case, it is assumed that the words contained in header data codewords and in conceal-information words are always replaced without being separated.

Figure 24:
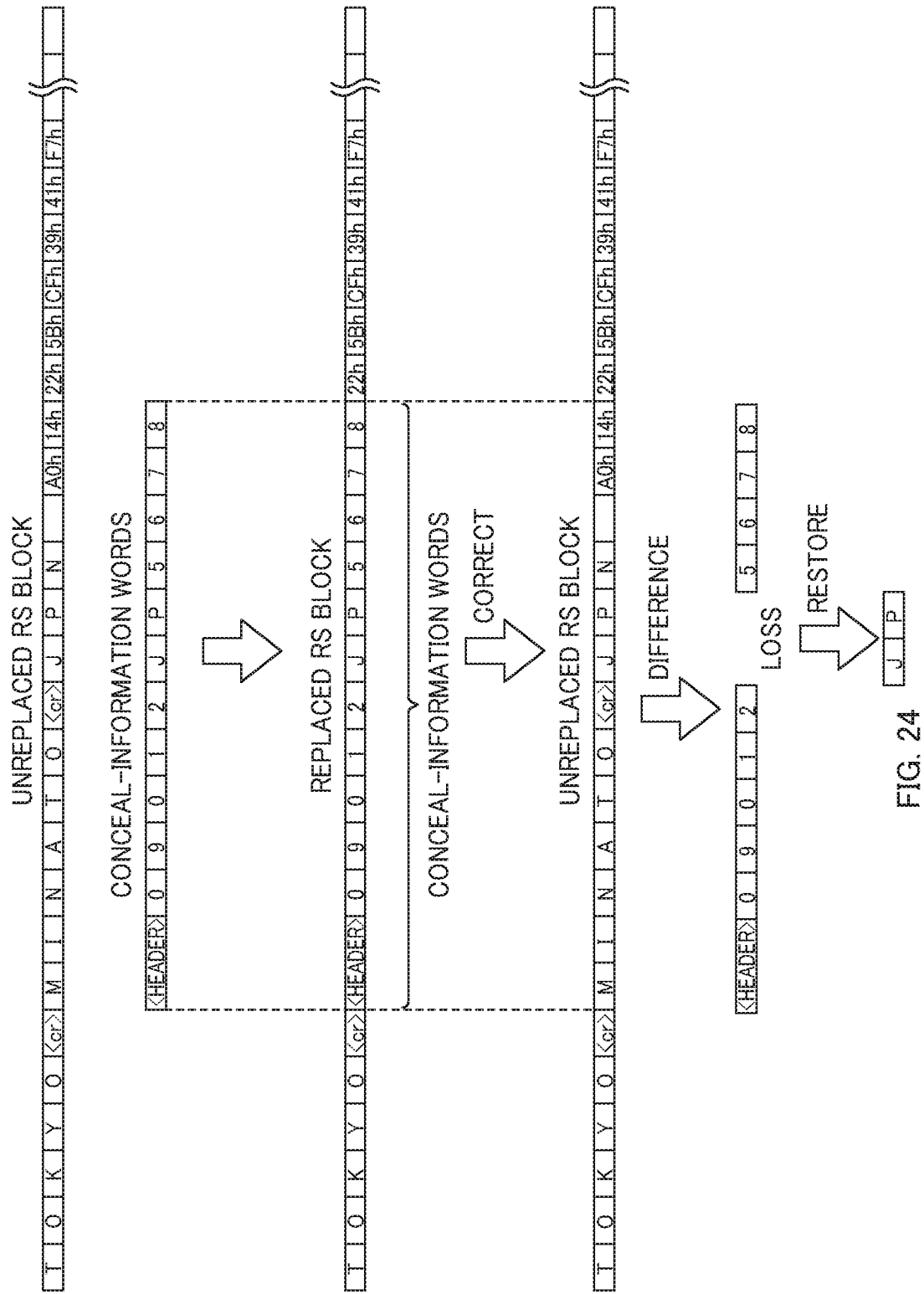
FIG. 24 is a third diagram illustrating how to replace a part of a RS block in a procedure according to the sixth embodiment.

FIG. 24 is a third diagram illustrating how to replace a part of a RS block in a procedure according to the sixth embodiment. In this example, the rule that the header data codewords and the conceal-information words are placed continuously is applied. Because of this rule, these words are always replaced continuously. Accordingly, even if accidentally-identical words are lost, the information can be restored by filling the lost part with the accidentally-identical words.

It is sufficient that, if codewords which are located at positions except for the ends of a RS block are lost, the lost parts are filled with the data codewords which are located at corresponding positions. However, if codewords which are located at an end of a RS block are lost, it is difficult to identify whether the loss has occurred at the initial end or at the final end. In this case, several restorations are performed for the end and are verified, as to be mentioned below.

Figure 25:
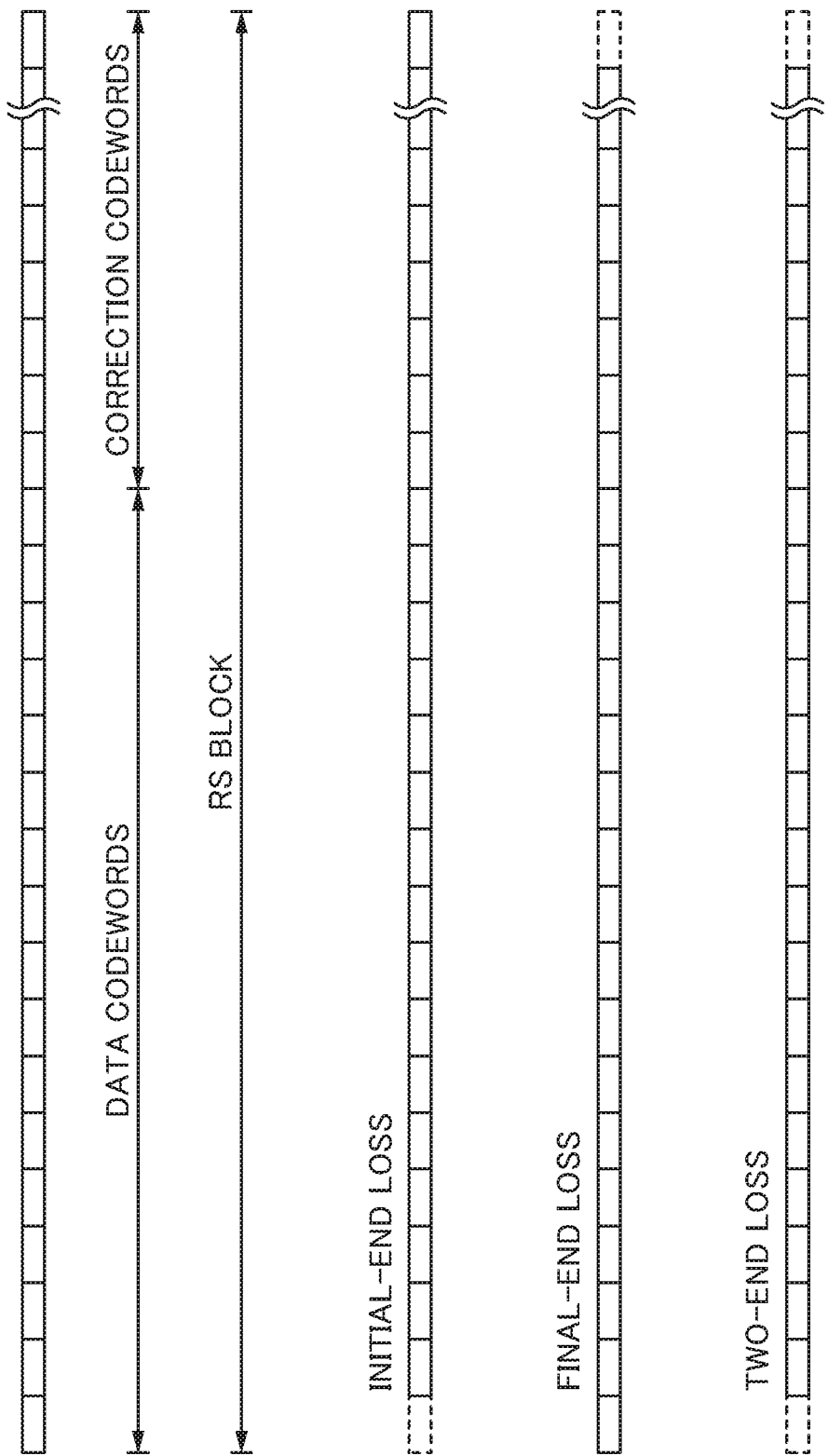
FIG. 25 is a diagram illustrating RS blocks having a data loss.

FIG. 25 is a diagram illustrating RS blocks a part of which is lost. FIG. 25 shows the following four types of RS blocks: a RS block without any loss; a RS block having a loss at the initial end of the data codewords (hereinafter referred to as an initial-end-loss RS block); a RS block having a loss at the final end of correction codewords (hereinafter referred to as a final-end-loss RS block); and a RS block having losses at both ends (hereinafter referred to as a two-end-loss RS block). For the purpose of explanation, there is no codeword in each cell. In these figures, the lost codewords are indicated by dashed lines. Thus, concerning the cases in which loss occurs at an end or ends of a RS block, there are three types.

For the initial end and the final end of such a RS block, there are possible combinations of restoration patterns. All restoration combinations are performed and are verified as follow: (1) whether correction can be processed for the restored RS block and (2) if the correction is processed, whether a result of the correction has a correct block syntax.

Figure 26:
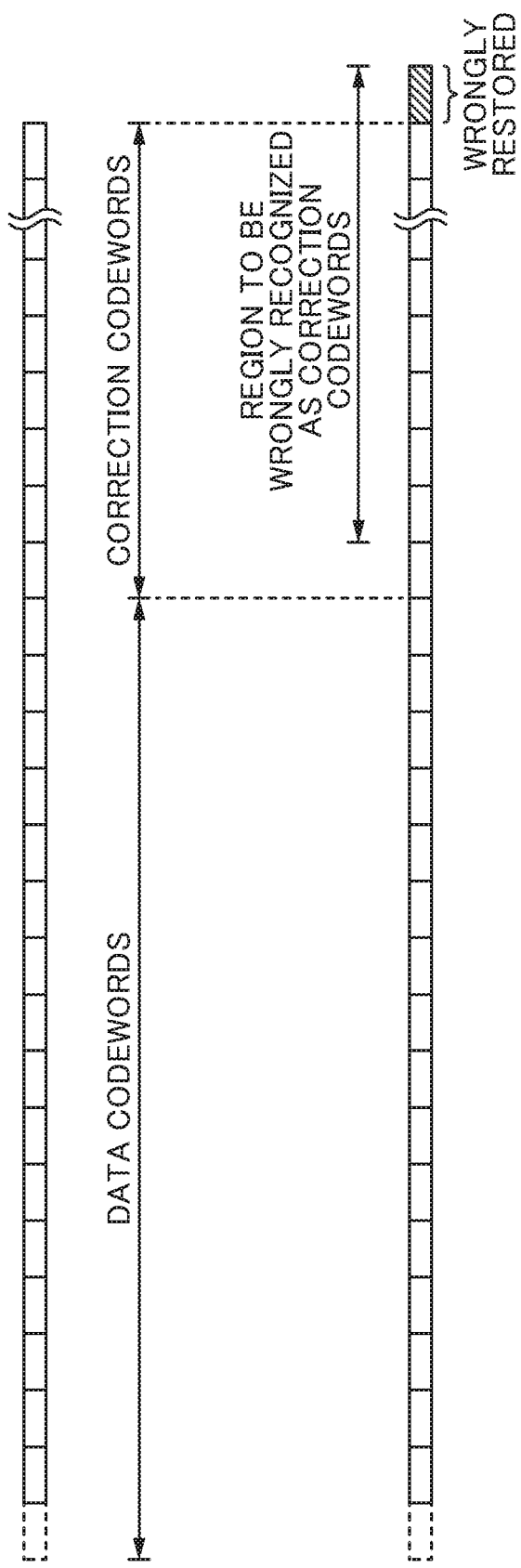
FIG. 26 is a diagram illustrating how to restore an initial-end-loss RS block.

FIG. 26 is a diagram illustrating how to restore an initial-end-loss RS block. FIG. 26 shows the initial-end-loss RS block which is wrongly restored. In the initial-end-loss RS block, the initial end of the RS block should be restored. But, from appearance of a RS block having a loss, it cannot be judged that whether the loss occurs at the initial end or at the final end. Accordingly, a RS block whose initial end is restored is generated, and also a RS block whose final end is restored is generated. These two RS blocks which have been restored will undergo correction using correction codewords.

Since the RS block whose initial end is restored is a correct RS block, correction is appropriately processed, and a result of the correction has a correct block syntax.

On the other hand, as shown in FIG. 26, in a RS block whose final end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, if a plurality of codewords are lost, the wrong positions are identified as the positions of correction codewords. Accordingly, correction is not appropriately processed.

Figure 27:
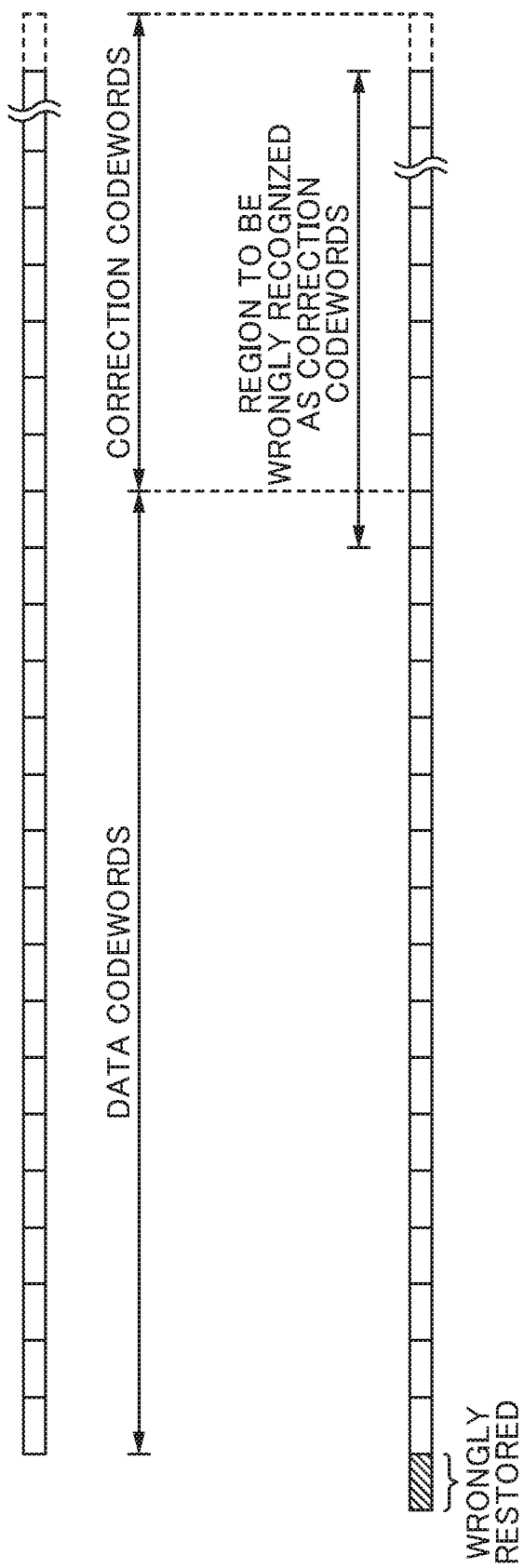
FIG. 27 is a diagram illustrating how to restore a final-end-loss RS block.

FIG. 27 is a diagram illustrating how to restore the final-end-loss RS block. FIG. 27 shows the final-end-loss RS block which is wrongly restored. In the final-end-loss RS block, the final end of the RS block should be restored. But, from appearance of a RS block having a loss, it cannot be judged that whether the loss occurs at the initial end or at the final end. Also in this case, a RS block whose initial end is restored is generated, and a RS block whose final end is restored is generated. These two RS blocks which have been restored will undergo correction using correction codewords.

Since the RS block whose final end is restored a correct RS block, correction is appropriately processed, and a result of the correction has a correct block syntax.

On the other hand, as shown in FIG. 27, in a RS block whose initial end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, if a plurality of codewords are lost, the wrong positions are identified as the positions of correction codewords. Accordingly, correction is not appropriately processed.

Figure 28:
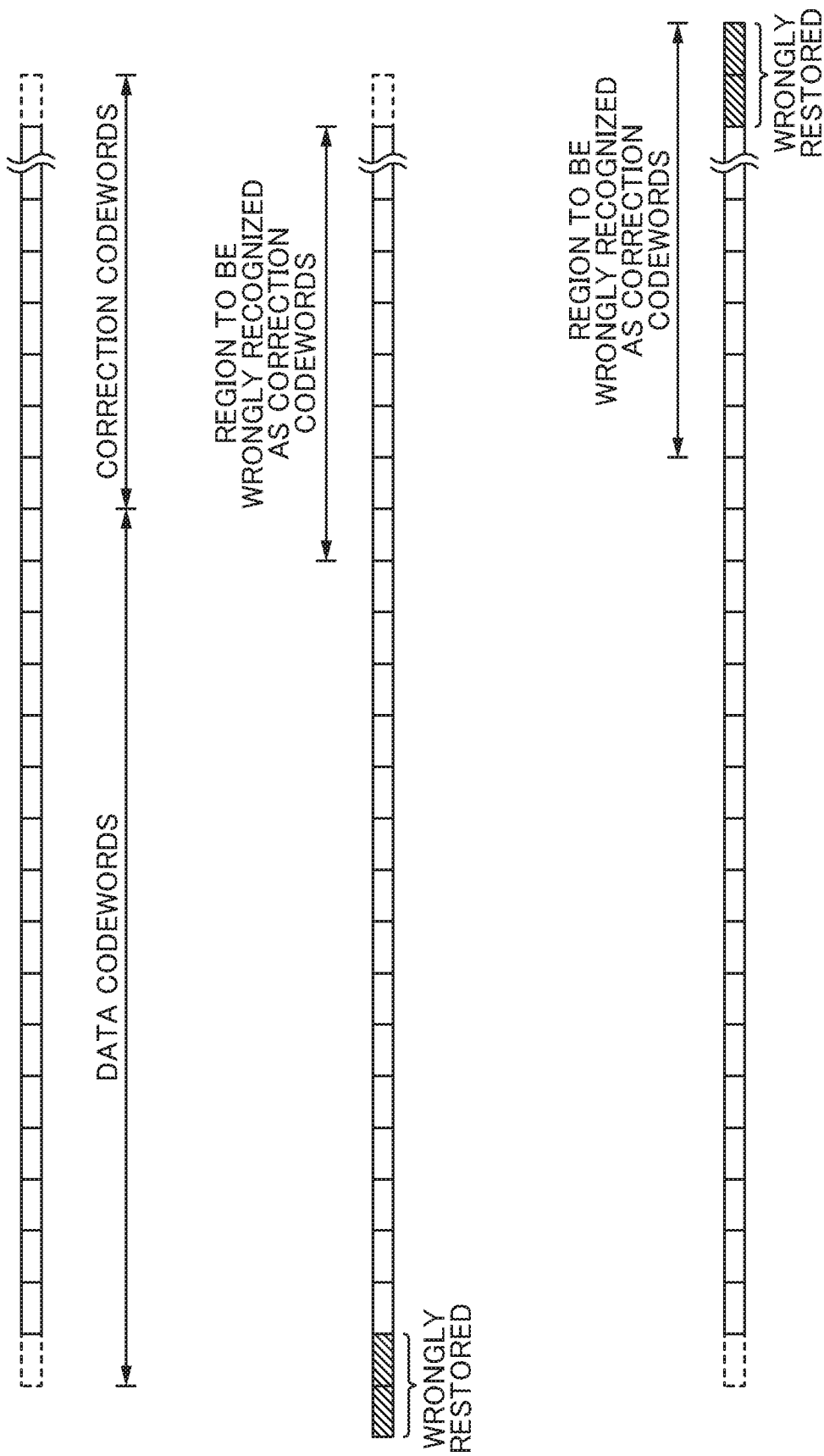
FIG. 28 is a diagram illustrating how to restore a two-end-loss RS block.

FIG. 28 is a diagram illustrating how to restore the two-end-loss RS block. FIG. 28 shows two-end-loss RS blocks which are wrongly restored. In this example, it is assumed that a loss of one codeword occurs at each end. In the two-end-loss RS block of these types, each of one-word losses at the initial end and at the final end should be restored. But, also in this case, from appearance of a RS block having losses, it cannot be judged how the loss occurs.

Accordingly, in this case, the following RS blocks are generated: a RS block in which two words at the initial end are restored; a RS block in which two words at the final end are restored; and a RS block in which two words respectively located at the initial and final ends are restored. For each of the restored RS blocks, correction is performed using a correcting block. A method for verification, which is subsequently performed, is the same as in a case in which the initial-end-loss RS block is restored and as in a case in which the final-end-loss RS block is restored. The description thereof will therefore be omitted.

As mentioned above, by restoring in all possible patterns and verifying the restoring, it is possible to acquire a RS block which has been appropriately restored.

In this example, though the foregoing three types of the cases are described, the number of times of verifications changes depending on the number of lost data codewords.

For example, if one data codeword is lost as mentioned above, there are two possible cases: a case in which one codeword at the initial end is lost; and a case in which one codeword at the final end is lost.

If two data codewords are lost, there are three possible cases: a case in which two codewords at the initial end are lost; a case in which two codewords at the initial end are lost and one codeword at the final end is lost; and a case in which two codewords at the final end are lost.

If three data codewords are lost, there are four possible cases: a case in which three data codewords at the initial end are lost; a case in which two codewords at the initial end are lost and one codeword at the final end is lost; a case in which one codeword at the initial end is lost and two codewords at the final end are lost; a case in which three data codewords at the final end are lost.

According to this regularity, if N codewords are lost at the ends in total, (N+1) types of verifications are performed. As a result of (N+1) types of verifications, it is possible to employ a RS block which has been appropriately corrected.

Thus, even if a case in which loss occurs at the initial end or at the final end, it is possible to appropriately restore the correct RS block by generating and verifying RS blocks which have been restored corresponding to the case. There is extremely rarely possible that a RS block which has been wrongly restored is corrected without trouble. In this case, however, the corrected block has a problem such that it is not satisfy the predetermined format. Accordingly, based on this, it can be judged that the block is not appropriately restored.

===Seventh Embodiment===

In the seventh embodiment, when an unreplaced RS block is replaced with conceal-information words, replacement is performed from the position which is of the word corresponding to the number of words identified by a mask pattern reference MPR. The mask pattern reference MPR is a reference which identifies a mask pattern in conformance with JIS (in this description, referred to as a "standard mask pattern"). In the seventh embodiment, the replacement positions of the conceal-information words are located using the mask pattern reference MPR, and consequently this makes it more difficult for a third party to extract the conceal-information words.

The mask pattern reference MPR is contained in format information FI of the QR code symbol 1. The format information FI also contains error correction level. According to JIS, masking with a standard mask pattern is applied to only a part of the encoding region which is neither an area of format information FI nor an area of version information. That is, the mask pattern reference MPR is not masked by the standard mask pattern.

Figure 29:
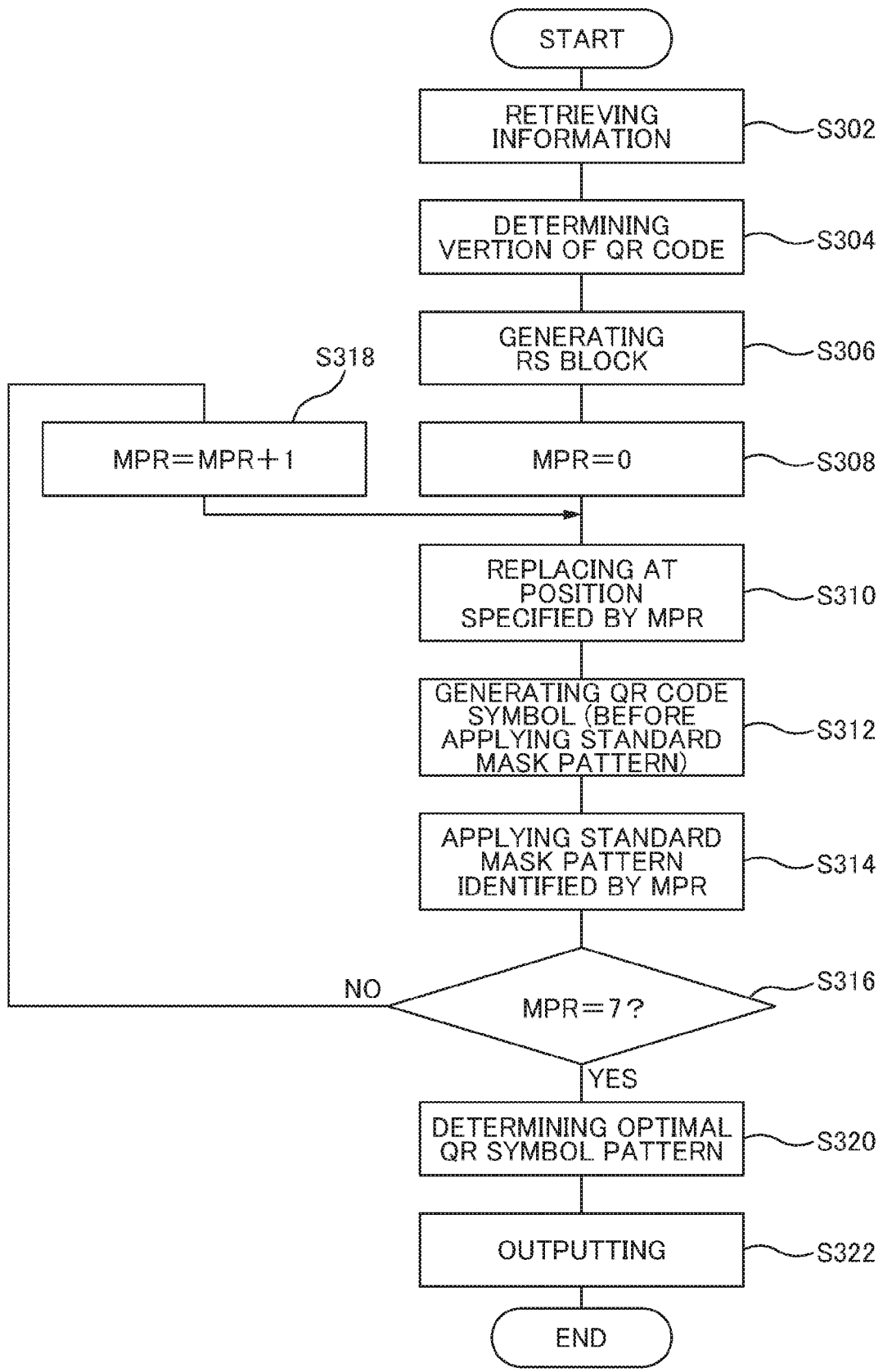
FIG. 29 is a flow chart of a method for generating a QR code symbol according to the seventh embodiment.

FIG. 29 is a flow chart of a method for generating a QR code symbol according to the seventh embodiment. A method for generating a QR code symbol according to the seventh embodiment will be described below with reference to the flow chart.

First, original data and conceal-information words which are embedded in the QR code symbol 1 are retrieved (S302). Next, according to the original data and the conceal-information words, the version of the QR code symbol 1 is determined (S304). Next, RS blocks are generated according to the codewords of the original data (S306). In these steps S302 to S306, a procedure for retrieving the original data and the conceal-information words, a procedure for determining the version, and a procedure for generating a RS block are the same as in the first embodiment. The description thereof will therefore be omitted.

Next, the value of the mask pattern reference MPR is reset to "0" (S308). With a mask pattern reference MPR in conformance with JIS, the value of the mask pattern reference MPR is within the range from 0 to 7 (from "000" to "111"). In this example, the value of the mask pattern reference MPR changes from 0 to 7, and the processes from step S310 to step S314 (to be described later) are repeatedly performed. For this reason, the value of the mask pattern reference MPR is reset to "0".

Next, the replacement with the conceal-information words is performed at the positions (replacement positions) which the mask pattern reference MPR locates (S310). In this example, the replacement with the conceal-information words is performed from the position which is of the word corresponding to the value of the mask pattern reference MPR from the initial word of the unreplaced RS block. For example, if the value of the mask pattern reference MPR is "0", the unreplaced RS block is replaced from its initial word with the conceal-information words. As mentioned above, the value of the mask pattern reference MPR is within the range from 0 to 7. Accordingly, the mask pattern reference MPR can identify 8 types of positions as the replacement position of the conceal-information words.

Figure 30:
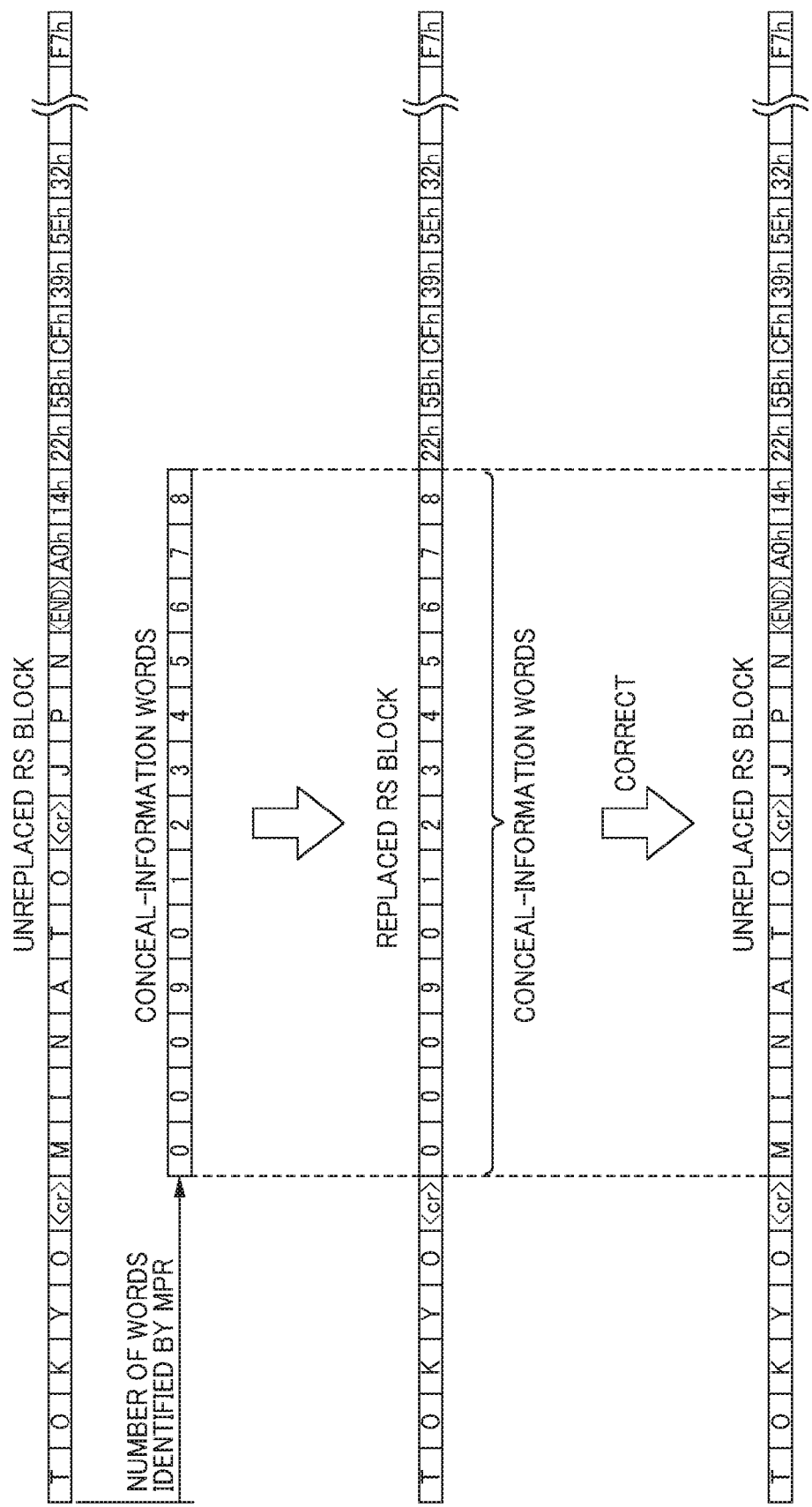
FIG. 30 is a diagram illustrating how to replace a part of a RS block in a procedure according to the seventh embodiment.

FIG. 30 is a diagram illustrating how to replace a part of a RS block in a procedure according to the seventh embodiment. FIG. 30 shows a case in which the value of the mask pattern reference MPR is "6" and in which the unreplaced RS block is replaced with the conceal-information words from the position which is of 6th word (six-word offset).

There is a procedure in which the replacement positions with conceal-information words is positions which are of the words corresponding to the value of mask pattern reference MPR, and the procedure is one of the simplest procedure for locating the replacement positions by the mask pattern reference MPR. However, the embodiment is not limited thereto. The replacement positions may be identified based on a position which is predetermined according to the value of the mask pattern reference MPR.

Next, as mentioned above, a QR code symbol before applying a standard mask pattern is generated based on the replaced RS block, in which a part of RS block is replaced (S312). To the QR code symbol before applying a standard mask pattern, a standard mask pattern is applied, the standard mask pattern being identified by the mask pattern reference MPR (S314). Applying a standard mask pattern is in conformance with JIS, and the description will be omitted.

Next, it is judged whether the value of the mask pattern reference MPR is 7 or not (S316). Accordingly, in all cases in which the value of the mask pattern reference MPR is different between 0 and 7, it is judged whether the processes from step S310 to step S314 have been performed or not. In step S316, if the value of the mask pattern reference MPR is not "7", the value of the mask pattern reference MPR increments (S318).

On the other hand, in step S316, if the value of the mask pattern reference MPR is "7", all QR code symbols have been generated which respectively correspond to the value of the mask pattern reference MPR from 0 to 7. And, these eight QR code symbols are evaluated and the optimal pattern of the QR code symbol is determined (S320).

Concerning evaluation of QR code symbols in step S320, "Evaluation of masking result" of JIS is applied thereto, and the description thereof will be omitted. By this evaluation, it is possible to specify a QR code symbol whose modules scatters reasonably.

Next, the QR code symbol which has been identified in step S320 is output (S320). The output QR code symbol may be displayed by the display device 13, and may be printed by the printing device 14.

Accordingly, the mask pattern reference MPR, which identifies the standard mask pattern applied to the QR code symbol, is used to locate a position of the RS block which is replaced with conceal-information words. Since there are 8 types of the standard mask patterns, the value of the mask pattern reference MPR can have 8 types of numbers. Depending on the applied standard mask pattern, it is therefore possible to change the replacement positions of the conceal-information words. This makes it difficult for a third party to locate the positions of the conceal-information words, and therefore it can be further difficult to extract the conceal-information words.

If a procedure according to the seventh embodiment is used, the QR code symbol in which the conceal-information words are placed at the optimal positions can be found at a time of evaluating in step S320 all QR code symbols which are each generated based on a different value of the mask pattern reference MPR from 0 to 7. Accordingly, until the evaluation of step S320, a QR code symbol which is to be employed cannot be decided among QR code symbols in which replacement positions with the conceal-information words are different. As mentioned above, the replacement positions with the conceal-information words cannot be determined in advance. This makes it more difficult to locate the positions of the conceal-information words, and therefore it can be further difficult to extract conceal-information words.

A standard mask pattern can be applied before replacement with conceal-information words in step S310. However, in terms of scattering modules in QR code symbol, it is desirable that a standard mask pattern is applied after replacement with conceal-information words in step S310.

In the same manner as in the foregoing first embodiment, masking with the standard mask pattern is performed after step S108. In this case, all standard mask patterns, each of which has a mask pattern reference MPR between "0" and "7", are applied. As in step S320 according to the seventh embodiment, the optimal QR code symbol will be selected among these QR code symbols.

Masking with the standard mask pattern is applied to only a part of the encoding region which is neither an area of format information FI nor an area of version information VI. Accordingly, the mask pattern reference MPR is not affected by masking with the standard mask pattern. At the time of reading a QR code symbol, it is possible to remove the standard mask pattern by appropriately read a mask pattern reference MPR from format information FI.

Next, a method for reading a QR code symbol according to the seventh embodiment will be described.

Figure 31:
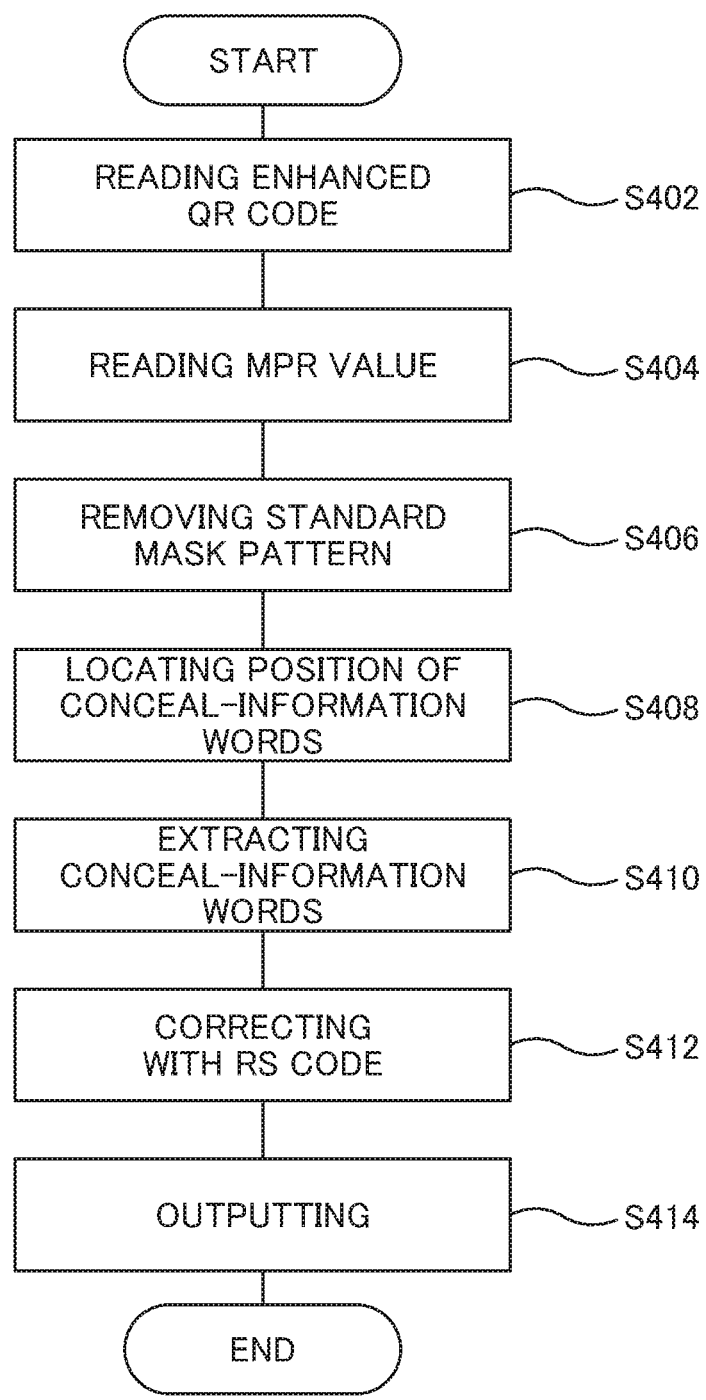
FIG. 31 is a flow chart of a method for reading a QR code symbol according to the seventh embodiment.

FIG. 31 is a flow chart of a method for reading a QR code symbol according to the seventh embodiment. With reference to the flow chart and the foregoing FIG. 30, a method for reading a QR code symbol according to the seventh embodiment will be described.

First, an enhanced QR code symbol is read (S402). A procedure for reading the enhanced QR code symbol is the same as a procedure in the first embodiment. The description thereof will therefore be omitted.

Next, the value of a mask pattern reference MPR is read (S404). The mask pattern reference MPR is information included in format information FI, as mentioned above. In the QR code symbol 1, the format information FI is not masked by a standard mask pattern. This makes it possible to appropriately read format information FI in a procedure prescribed in JIS. The mask pattern reference MPR included in format information FI can be identified.

Next, the standard mask pattern of the QR code symbol is removed (S406). The standard mask pattern applied to the QR code symbol 1 can be identified by the mask pattern reference MPR. Using the identified standard mask pattern, the standard mask pattern applied to the QR code symbol 1 is removed.

Next, a plurality of RS blocks (in this example, replaced RS blocks) are expanded from the QR code symbol whose standard mask pattern has been removed. The mask pattern reference MPR locates the positions of conceal-information words in the replaced RS block (S408). In this example, the beginning position of the conceal-information words is a position which is of the word corresponding to the value of the mask pattern reference MPR from the initial word of the replaced RS block.

FIG. 30 is referred herein again. For example, if the value of the mask pattern reference MPR is "6", the beginning position of the conceal-information words is the position which is of the 6th word (six-word offset) from the initial word of the replaced RS block, as shown in FIG. 30.

Next, the conceal-information words are extracted from the identified positions of the conceal-information words (S410). The replaced RS block is corrected using a Reed-Solomon code (S412). By correcting using the Reed-Solomon code, the replaced RS block is converted into an unreplaced RS block. It is possible to extract the original data from the unreplaced RS block.

Next, the original data and the conceal-information words which have been obtained are output (S414). The output may be displayed by the display device 13, and may be printed by the printing device 14.

As mentioned above, the positions of the conceal-information words are defined based on the mask pattern reference MPR. Also, the positions of the conceal-information words may be defined using the version information of a QR code symbol. The versions of the QR codes range from version 1 to version 40 in JIS. Accordingly, based on the combination of 8 types of the mask pattern reference MPRs and 40 types of the versions, the positions of the conceal-information words can be determined in a different manner of 320 types in total.

In addition to the foregoing combination, the information of the error correction level of QR code symbol may be combined. In JIS, there are four error correction levels: "level L", "level M", "level Q", and "level H". Accordingly, based on the additional combination with these four types, the positions of the conceal-information words can be determined in a different manner of 1280 types in total.

In this example, conceal-information words are replaced continuously from the identified position. But, conceal-information words may be replaced separately as in the foregoing FIG. 18.

===Eighth Embodiment===

Figure 32:
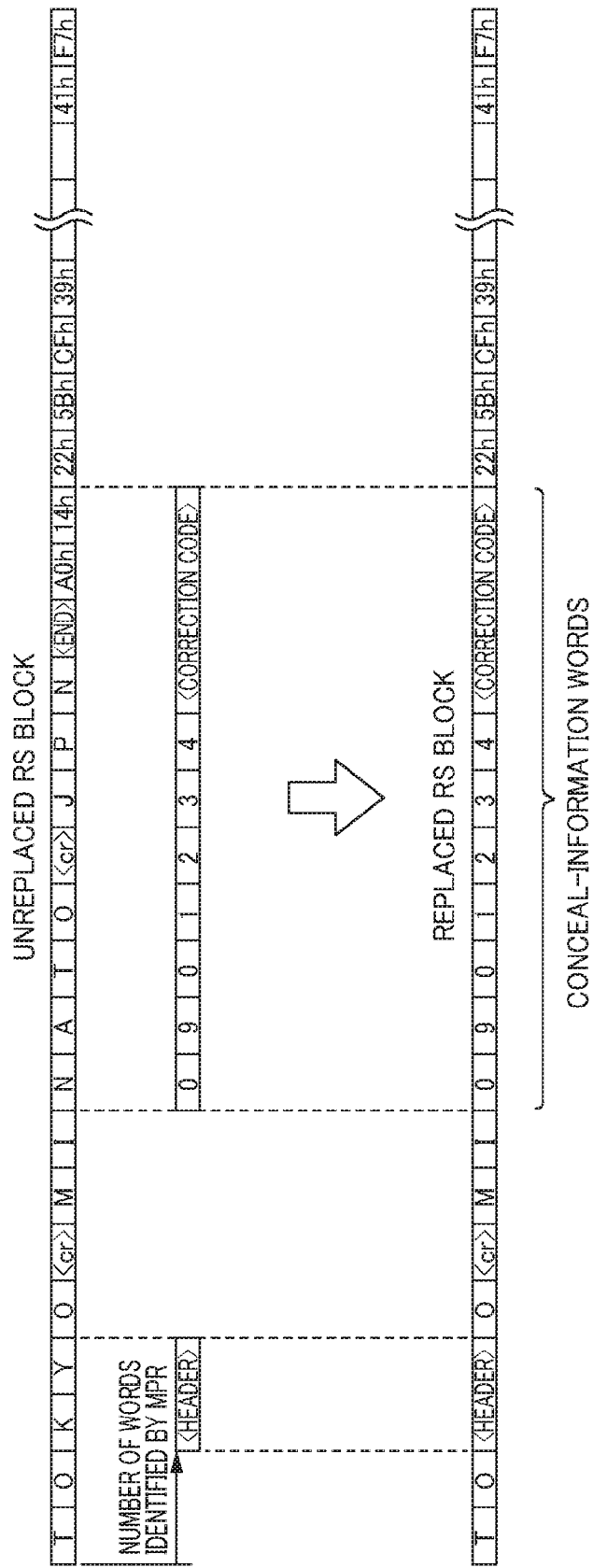
FIG. 32 is a diagram illustrating how to replace a part of a RS block in a procedure according to the eighth embodiment.

FIG. 32 is a diagram illustrating how to replace a part of a RS block in a procedure according to the eighth embodiment. In the eighth embodiment, as in the foregoing second embodiment, a part of an unreplaced RS block is replaced with header data codewords and conceal-information words, to generate a replaced RS block. In this case, replacement with the conceal-information words is performed at the positions indicated by the header data codewords.

In the eighth embodiment, identifying replacement positions by the value of the mask pattern reference MPR is the same as the seventh embodiment. A method for generating a QR code symbol according to the eighth embodiment will be described below with reference to a flow chart, which is partly different from the flow chart used in the seventh embodiment.

Processes from step S302 to step S308 are the same as in the seventh embodiment. The description thereof will therefore be omitted. In the eighth embodiment, the difference from the seventh embodiment is a process in step S310. In the eighth embodiment, replacement with the header data codewords is performed from the replacement start position, which is of the word corresponding to the value of the mask pattern reference MPR from the initial word of the unreplaced RS block. At the position identified by the header data codewords, a part of unreplaced RS block is replaced with the conceal-information words.

FIG. 32 shows a case in which the value of the mask pattern reference MPR is "2" and in which the unreplaced RS block is replaced with the header data codewords at the position which is of the 2nd word (two-word offset) from the initial word of the unreplaced RS block. As the replacement position with the conceal-information words, the header data codewords indicates a position which is of the eighth word (eight-word offset) from the initial word of the unreplaced RS block. Accordingly, the unreplaced RS block replaced with the conceal-information words from the position which is of the eighth word (eight-word offset) from the initial word of the unreplaced RS block.

Below, processes from step S312 to step S322 are the same as in the seventh embodiment and the description thereof is omitted.

It is preferable that the replacement positions with the header data codewords do not overlap the replacement positions with the conceal-information words. This is because, if these positions overlap, it is impossible to precisely recover at least either one of the header data codewords and the conceal-information words.

Next, modifying a part of the flow chart of the seventh embodiment, a method for reading a QR code symbol according to the eighth embodiment will be described.

Processes from step S402 to step S406 are the same as in the seventh embodiment. The description thereof will therefore be omitted. In the eighth embodiment, the difference from the seventh embodiment is processes in step S408 and step S410. In step S408 of the eighth embodiment, the positions of the header data codewords are located based on the value of the mask pattern reference MPR, and the header data codewords are extracted. In step S410, the positions of the conceal-information words are located using the header data codewords, and the conceal-information words are extracted.

Processes from step S412 to step S414 are the same as in the seventh embodiment and the description thereof is omitted.

Accordingly, the mask pattern reference MPR, which identifies the standard mask pattern applied to the QR code symbol, is used to locate a position of the RS block which is replaced with header data codewords. Since there are 8 types of the standard mask patterns, the value of the mask pattern reference MPR can have 8 types of numbers. Depending on the applied standard mask pattern, it is therefore possible to change the replacement positions of the header data codewords. This makes it difficult for a third party to locate the positions of the header data codewords, and therefore it can be further difficult to extract conceal-information words.

Using a procedure according to the eighth embodiment, the QR code symbol in which the header data codewords are placed at the optimal positions can be found at a time of evaluating in step S320 all QR code symbols which are each generated based on a different value of the mask pattern reference MPR from 0 to 7. Until the evaluation of step S320, a QR code symbol which is to be employed cannot be decided among the QR code symbol in which replacement positions with the header data codewords are different. As mentioned above, the replacement positions with the header data codewords cannot be determined in advance. This makes it difficult to locate the positions of the header data codewords. Since locating the positions of the header data codewords is difficult, it is further difficult to locate the positions of the conceal-information words. This allows extraction of the conceal-information words to be difficult.

===Ninth Embodiment===

In the ninth embodiment, when an unreplaced RS block is replaced with conceal-information words, positions at which replacement is performed are identified based on correction codewords (a RS code). A method for generating a QR code symbol according to the ninth embodiment will be described below with reference to a flow chart, which is partly different from the flow chart used in the first embodiment.

Processes from step S102 to step S106 are the same as in the first embodiment. The description thereof will therefore be omitted. In the ninth embodiment, the difference from the first embodiment is that, between step S106 and step S108, the replacement positions of the conceal-information words is identified based on the correction codewords.

Figure 33:
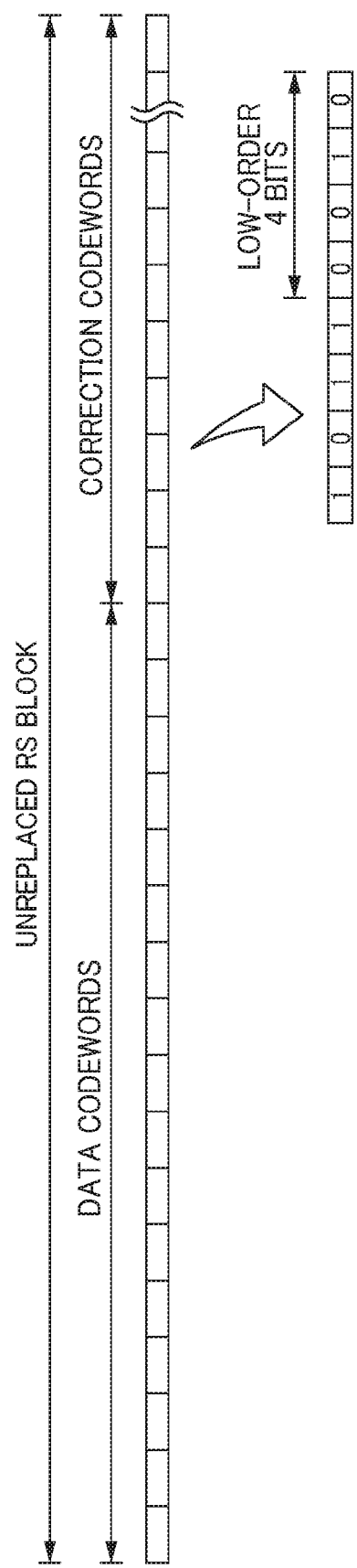
FIG. 33 is a first diagram illustrating how to replace a part of a RS block in a procedure according to the ninth embodiment.

FIG. 33 is a first diagram illustrating how to replace a part of a RS block in a procedure according to the ninth embodiment. FIG. 33 shows an unreplaced RS block. In the ninth embodiment, the replacement positions with the conceal-information words are identified based on multiple bits of a specific byte in the correction codewords. Specifically speaking, in this example, the third byte of the correction codewords is extracted, and low-order 4 bits are extracted from the byte. The replacement positions with the conceal-information words are indicated by the values of these low-order 4 bits. FIG. 33 shows the digits "0010" as information of the low-order 4 bits. The digits "0010" mean "2" in decimal form. But, in this example, since "0" means a first position, "0010" means the third position from the initial word. Next, replacement with conceal-information words is performed based on the replacement positions (S108).

Figure 34:
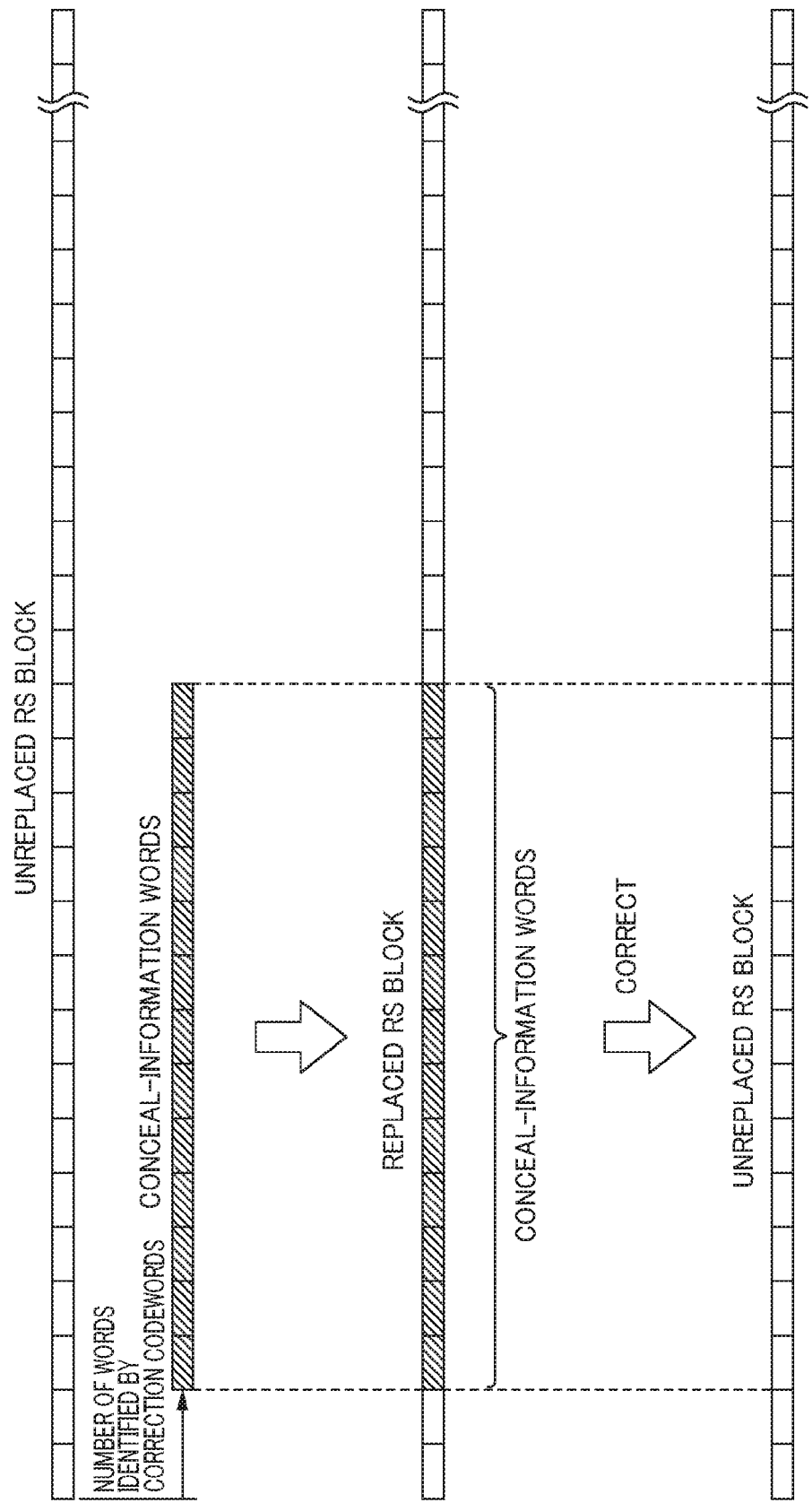
FIG. 34 is a second diagram illustrating how to replace a part of a RS block in a procedure according to the ninth embodiment.

FIG. 34 is a second diagram illustrating how to replace a part of a RS block in a procedure according to the ninth embodiment. FIG. 34 shows replacement with the conceal-information words from the position which is of the third byte (the position of the third word) from the initial word of the unreplaced RS block. As mentioned above, the replacement positions of the conceal-information words are identified based on the correction codewords, and replacement with the conceal-information words is performed.

When replacement with the conceal-information words is performed as mentioned above (S108), a QR code is generated based on the replaced RS block (S110). Then, masking in the standard mask pattern is performed. Masking in the standard mask pattern is in conformance with JIS.

The correction codewords are obtained based on the data codewords. Accordingly, if the data codewords are different, the correction codewords are also different. That is, when the replacement positions are identified based on the correction codewords, if the data codewords are different, the replacement positions are also different. This makes it difficult for a third party to locate the positions of the conceal-information words, and therefore it can be further difficult to extract the conceal-information words.

Next, modifying a part of the flow chart of the first embodiment, a method for reading a QR code symbol according to the ninth embodiment will be described.

Processes from step S202 to step S204 are the same as in the first embodiment. The description thereof will therefore be omitted. In the ninth embodiment, the difference from the first embodiment is a process in step S206. In the ninth embodiment, the replacement positions with the conceal-information words are identified based on a bit of a specific byte in the correction codewords. In this example, the third byte of the correction codeword is extracted as mentioned above, and low-order 4 bits are extracted from the byte. the replacement positions with the conceal-information words are identified based on the values of these low-order 4 bits. As shown in FIG. 34, this makes it possible to appropriately identify the positions of the conceal-information words and to extract the conceal-information words.

When the replaced RS block is subsequently corrected using the correction codewords, the data codewords can be appropriately extracted.

Outputting the result of the extracted data is the same as in the first embodiment (S108) and the description thereof is omitted.

When a part of the unreplaced RS block is replaced with conceal-information words, there is a possibility that the bytes of the correction codewords for identifying the replacement position are replaced. In this case, the replaced RS block may be corrected in advance using the correction codewords. Since this makes it possible to acquire the unreplaced RS block, it is possible to appropriately extract the bytes of the correction codewords for identifying the replacement position.

In the foregoing description, the third byte of the correction codewords is used. No matter of course, another byte of the correction codewords may be used. Using low-order bits makes it possible to indicate 16 patterns of the positions, and, by using 5 or more bits, it is possible to increase the number of the positions patterns which can be indicated.

In the description above, the correction codewords are used in order to identify the replacement positions with the conceal-information words. However, a concept of the second embodiment, header data codewords, may be introduced, and the position of the header data codeword may be identified by the foregoing correction codewords. The error correction codewords are obtained based on the data codewords. Accordingly, if the data codewords are different, the error correction codewords are also different. That is, when the replacement positions are identified based on the error correction codewords, if data codewords are different, the replacement positions are also different. This makes it difficult for a third party to locate the positions of the header data codewords. Since the header data codewords locate the positions of conceal-information words, it can be therefore further difficult to extract the conceal-information words.

===Application Example===

The foregoing QR code symbol can be used, for example, by printing on tickets of an event or a concert to be sold on reservation sales services. In this case, the "information to be displayed" can be "name of event", "seat information", "reservation number", and "URL". On the other hand, the conceal information can be "information used at the time of booking". As the "information used at the time of booking", the following information can be employed: ID information such as "Gender", "Age", "Name", and "License card"; or "Passphrase".

Under the foregoing conditions, counterfeiting in which a new QR code is generated by using only information to be displayed will be assumed. In this case, the QR code symbol does not include conceal information. It is therefore possible to determine that the QR code symbol is a forged one.

In a case of copying and using a QR code symbol which is generated according to any one of embodiments from the first embodiment to the sixth embodiment, the enhanced decoder 20 reads conceal information. Then, the ticket holder's identify is verified based on ID information such as "Gender", "Age", and "License card" or "Passphrase", which is contained in the conceal information. This makes it possible to prevent unauthorized use and spoofing.

REFERENCE SIGNS LIST 10 enhanced encoder,
11 control section, 11a operation section, 11b storage section,
13 display device, 14 printing device, 15 input device,
20 enhanced decoder,
21 control section, 21a operation section, 21b storage section,
22 imaging device, 23 display device, 24 printing device, 25 input device

The invention claimed is:

1. A method for generating a two-dimensional barcode comprising:
obtaining a data block including a first data codeword and an error correction codeword,
the first data codeword having first information,
the error correction codeword being capable of detecting and correcting an error of the first data codeword;
obtaining a replaced data block in which a part of the data block is replaced with a second data codeword,
the second data codeword having second information; and
generating a two-dimensional barcode based on the replaced data block,
wherein obtaining the replaced data block includes:
identifying a replacement position in the data block based on the error correction codeword; and
replacing a part of the data block with the second data codeword at the replacement position.

2. A device for generating a two-dimensional barcode, wherein
the device generates according to the method of claim 1, a two-dimensional barcode based on a replaced data block,
the replaced data block in which a part of a data block is replaced with a second data codeword,
the data block including a first data codeword and an error correction codeword,
the first data codeword having first information,
the error correction codeword being capable of detecting and correcting an error of the first data codeword,
the second data codeword having second information.

3. A non-transitory computer-readable storage medium storing a program causing a computer to perform the method as recited in claim 1.

4. A method for generating a two-dimensional barcode comprising;
obtaining a data block including a first data codeword and an error correction codeword,
the first data codeword having first information,
the error correction codeword being capable of detecting and correcting an error of the first data codeword;
obtaining a replaced data block in which a part of the data block is replaced with a second data codeword,
the second data codeword having second information; and
generating a two-dimensional barcode based on the replaced data block,
wherein the replaced data block includes a header data codeword, and the header data codeword contains placement information of the second data codeword in the replaced data block, and
wherein obtaining the replaced data block includes:
identifying a replacement position in the data block based on the error correction codeword;
replacing a part of the data block with the header data codeword at the identified replacement position; and
replacing a part of the data block with the second data codeword at a position that is specified by the header data codeword.

5. A non-transitory computer-readable storage medium storing a program causing a computer to perform the method as recited in claim 4.

* * * * *